US012632971B2

(12) United States Patent
Zhang et al.

(10) Patent No.: US 12,632,971 B2
(45) Date of Patent: May 19, 2026

(54) TRAJECTORY PREDICTION METHOD AND APPARATUS, DEVICE, STORAGE MEDIUM AND PROGRAM

(71) Applicants:SENSETIME GROUP LIMITED, Hong Kong (CN); HONDA MOTOR CO. LTD., Tokyo (JP)

(72) Inventors: Shiquan Zhang, Hong Kong (CN); Yining Li, Hong Kong (CN); Qinhong Jiang, Hong Kong (CN); Jianping Shi, Hong Kong (CN); Bolei Zhou, Hong Kong (CN)

(73) Assignees: Sensetime Group Limited, Hong Kong (CN); Honda Motor Co., Ltd., Tokyo (JP)

( * ) Notice: Subject to any disclaimer, the term of this patent is extended or adjusted under 35 U.S.C. 154(b) by 510 days.

(21) Appl. No.: 18/148,462

(22) Filed: Dec. 30, 2022

(65) Prior Publication Data

US 2023/0142676 A1 May 11, 2023

Related U.S. Application Data

(63) Continuation of application No. PCT/CN2021/009871, filed on Jul. 30, 2021.

(30) Foreign Application Priority Data

Jul. 31, 2020 (CN) .......................... 202010763409.4

(51) Int. Cl.
*G06T 7/20* (2017.01)
*G06T 7/246* (2017.01)

(52) U.S. Cl.
CPC .... *G06T 7/248* (2017.01); *G06T 2207/20084* (2013.01); *G06T 2207/20221* (2013.01);
(Continued)

(58) Field of Classification Search
None
See application file for complete search history.

(56) References Cited

U.S. PATENT DOCUMENTS 9,963,106 B1    5/2018  Ricci
10,031,523 B2   7/2018  Ricci
(Continued)

FOREIGN PATENT DOCUMENTS

AU        2020100371 A4 *   4/2020
CN          1847817 A      10/2006
(Continued)

OTHER PUBLICATIONS

P. Kumar, M. Perrollaz, S. Lefèvre and C. Laugier, "Learning-based approach for online lane change intention prediction," 2013 IEEE Intelligent Vehicles Symposium (IV), Gold Coast, QLD, Australia, 2013, pp. 797-802, doi: 10.1109/IVS.2013.6629564. (Year: 2013).*
(Continued)

*Primary Examiner* — Amandeep Saini
*Assistant Examiner* — Caroline Tabancay Duffy
(74) *Attorney, Agent, or Firm* — Cooper Legal Group, LLC

(57) ABSTRACT

Provided are a trajectory prediction method, an electronic device, and a storage medium. The method including that: a motion intention of an object is determined according to time-series location information and time-series posture information of the object, where the time-series location information is position information of the object at different time points within a preset time period, and the time-series posture information is posture information of the object at different time points within the preset time period, where the posture information at different time points includes orientation information of multiple parts of the object at the different time points; and a future trajectory of the object is
(Continued)

determined according to the time-series location information, the time-series posture information and the motion intention.

13 Claims, 12 Drawing Sheets

(52) U.S. Cl.
CPC .............. *G06T 2207/30196* (2013.01); *G06T 2207/30241* (2013.01)

(56) References Cited

U.S. PATENT DOCUMENTS

| | | | |
|---|---|---|---|
| 10,083,604 | B2 | 9/2018 | Ricci |
| 11,024,160 | B2 | 6/2021 | Ricci |
| 2018/0074505 | A1 | 3/2018 | Lv |
| 2018/0126951 | A1 | 5/2018 | Ricci |
| 2018/0126985 | A1 | 5/2018 | Lee |
| 2018/0127001 | A1 | 5/2018 | Ricci |
| 2018/0129204 | A1 | 5/2018 | Ricci et al. |
| 2018/0130347 | A1 | 5/2018 | Ricci et al. |
| 2019/0031202 | A1* | 1/2019 | Takeda ................ B60T 8/17557 |
| 2019/0051198 | A1* | 2/2019 | Nimmagadda ........ G01C 21/20 |
| 2019/0367020 | A1 | 12/2019 | Yan |
| 2020/0051254 | A1* | 2/2020 | Habibian ................... G06T 7/75 |
| 2020/0269874 | A1* | 8/2020 | Zhan ........................ G01S 7/003 |
| 2020/0279487 | A1 | 9/2020 | Toda et al. |
| 2021/0192941 | A1 | 6/2021 | Ricci |
| 2021/0201052 | A1* | 7/2021 | Ranga ........................ G06T 7/70 |
| 2021/0404814 | A1* | 12/2021 | Hess .......................... G06T 7/97 |

FOREIGN PATENT DOCUMENTS

| | | | | |
|---|---|---|---|---|
| CN | 107423679 | A | 12/2017 | |
| CN | 109801508 | A | 5/2019 | |
| CN | 109969172 | A * | 7/2019 | ............ B60W 30/08 |
| CN | 110059598 | A | 7/2019 | |
| CN | 110147743 | A | 8/2019 | |
| CN | 110210417 | A | 9/2019 | |
| CN | 110796856 | A * | 2/2020 | ............ G08G 1/167 |
| CN | 111095380 | A | 5/2020 | |
| CN | 111401233 | A | 7/2020 | |
| CN | 111402632 | A | 7/2020 | |
| CN | 111942407 | A | 11/2020 | |
| DE | 102016217770 | A1 | 3/2018 | |
| EP | 1223567 | A1 | 7/2002 | |
| JP | 2019008460 | A | 1/2019 | |
| JP | 2019527862 | A | 10/2019 | |
| JP | 2019220054 | A | 12/2019 | |
| WO | 2020058740 | A1 | 3/2020 | |

OTHER PUBLICATIONS

L. Xin, et al., "Intention-aware Long Horizon Trajectory Prediction of Surrounding Vehicles using Dual LSTM Networks," 2018 21st International Conference on Intelligent Transportation Systems (ITSC), Maui, HI, USA, 2018, pp. 1441-1446. doi: 10.1109/ITSC.2018. 8569595. (Year: 2018).*

F. Schneemann and P. Heinemann, "Context-based detection of pedestrian crossing intention for autonomous driving in urban environments," 2016 IEEE/RSJ International Conference on Intelligent Robots and Systems (IROS), Daejeon, Korea (South), 2016, pp. 2243-2248, doi: 10.1109/IROS.2016.7759351. (Year: 2016).*

Zhang H, Liu Y, Wang C, Fu R, Sun Q, Li Z. Research on a Pedestrian Crossing Intention Recognition Model Based on Natural Observation Data. Sensors (Basel). Mar. 23, 2020;20(6):1776. doi: 10.3390/s20061776. (Year: 2020).*

R. Quintero Mínguez, et al. "Pedestrian Path, Pose, and Intention Prediction Through Gaussian Process Dynamical Models and Pedestrian Activity Recognition," in IEEE Transactions on Intelligent Transportation Systems, vol. 20, No. 5, pp. 1803-1814, May 2019, doi: 10.1109/TITS.2018.2836305. (Year: 2019).*

S.-S. Kim, I.-Y. Gwak and S.-W. Lee, "Coarse-to-Fine Deep Learning of Continuous Pedestrian Orientation Based on Spatial Co-Occurrence Feature," in IEEE Transactions on Intelligent Transportation Systems, vol. 21, No. 6, pp. 2522-2533, Jun. 2020, doi: 10.1109/TITS.2019.2919920. (Year: 2020).*

Second Office Action of the Japanese application No. 2022-546580, issued on Jan. 16, 2024. 10 pages with English translation.

First Office Action of the Japanese application No. 2022-546580, issued on Aug. 22, 2023, 13 pages with English translation.

English translation of the Written Opinion of the International Search Authority in the international application No. PCT/CN2021/ 109871, mailed on Nov. 4, 2021, 5 pages.

International Search Report in the international application No. PCT /CN2021/109871, mailed on Nov. 4, 2021, 3 pgs.

"Pie: A Large-Scale Dataset and Models for Pedestrian Intention Estimation and Trajectory Prediction", 2019, Amir Rasouli, Juliia Kotseruba, Toni Kunic and John K. Tsotsos, In Proceedings of the IEEE International Conference on Computer Vision, pp. 6262-6271.

"Pedestrian Intention Recognition using Latent-dynamic Conditional Random Fields", Jun. 2015, Andreas TH Schulz and Rainer Stiefelhagen, 2015 IEEE Intelligent Vehicles Symposium (IV), COEX, Seoul, Korea, pp. 622-627.

First Office Action of the Chinese application No. 202010763409.4, issued on May 8, 2021, 19 pgs.

Second Office Action of the Chinese application No. 202010763409. 4, issued on Nov. 26, 2021, 15 pgs.

Notice of Allowance of the Chinese application No. 202010763409. 4, issued on Aug. 3, 2022, 6 pgs.

\* cited by examiner

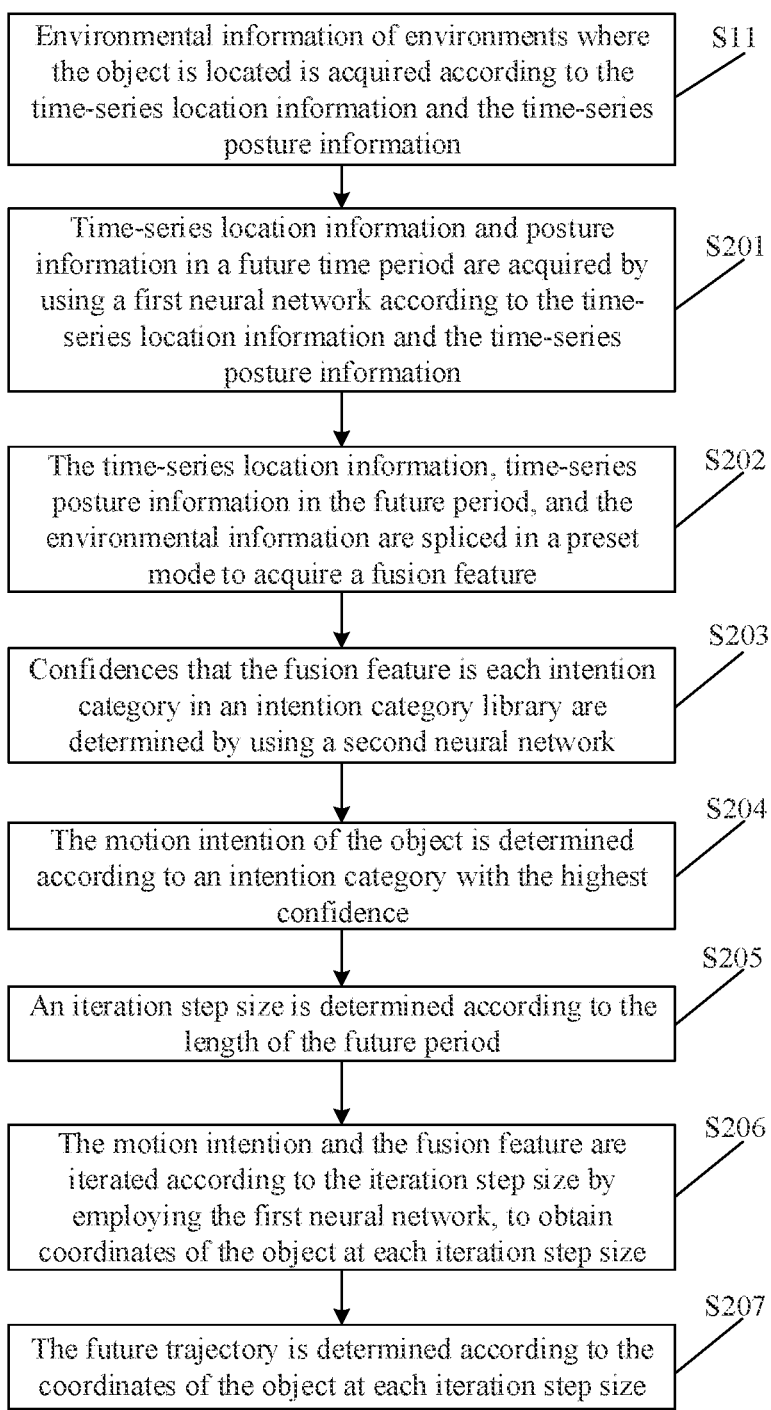

Environmental information of environments where the object is located is acquired according to the time-series location information and the time-series posture information — S11

Time-series location information and posture information in a future time period are acquired by using a first neural network according to the time-series location information and the time-series posture information — S201

The time-series location information, time-series posture information in the future period, and the environmental information are spliced in a preset mode to acquire a fusion feature — S202

Confidences that the fusion feature is each intention category in an intention category library are determined by using a second neural network — S203

The motion intention of the object is determined according to an intention category with the highest confidence — S204

An iteration step size is determined according to the length of the future period — S205

The motion intention and the fusion feature are iterated according to the iteration step size by employing the first neural network, to obtain coordinates of the object at each iteration step size — S206

The future trajectory is determined according to the coordinates of the object at each iteration step size — S207

FIG. 3B

TRAJECTORY PREDICTION METHOD AND APPARATUS, DEVICE, STORAGE MEDIUM AND PROGRAM

CROSS-REFERENCE TO RELATED APPLICATIONS

This application is a continuation of International Patent Application No. PCT/CN2021/109871, filed on Jul. 30, 2021, which claims priority to Chinese Patent Application No. 202010763409.4, filed on Jul. 31, 2020. The disclosures of International Patent Application No. PCT/CN2021/109871 and Chinese Patent Application No. 202010763409.4 are hereby incorporated by reference in their entireties.

BACKGROUND

In the process of predicting the trajectory of pedestrians or vehicles, the intrinsic relationship of the historical motion of trajectory of the pedestrians or the vehicles is mainly considered, such as using historical trajectory location information of the pedestrians or the vehicles to predict the future trajectory.

SUMMARY

The embodiments of the disclosure relate to the technical field of intelligent driving, and particularly provide a trajectory prediction method and apparatus, an electronic device, a storage medium and a program.

The embodiments of the disclosure provide a trajectory prediction method, which is executed by an electronic device and includes the following operations.

A motion intention of an object is determined according to time-series location information and time-series posture information of the object. Herein, the time-series location information is location information of the object at different time points within a preset time length, and the time-series posture information is posture information of the object at different time points within the preset time length. The posture information at different time points includes orientation information of a plurality of parts of the object at different time points. A future trajectory of the object is determined according to the time-series location information, the time-series posture information, and the motion intention.

The embodiments of the disclosure provide a trajectory prediction apparatus, which includes an intention determination module and a future trajectory determination module.

The intention determination module is configured to determine a motion intention of an object according to time-series location information and time-series posture information of the object. The time-series location information is location information of the object at different time points within a preset time length, and the time-series posture information is posture information of the object at different time points within the preset time length. The posture information at different time points including orientation information of a plurality of parts of the object at the different time points. The future trajectory determination module is configured to determine a future trajectory of the object according to the time-series location information, the time-series posture information, and the motion intention.

The embodiments of the disclosure provide a computer storage medium, having stored thereon computer executable instructions, that, when being executed, enable to implement the trajectory prediction method as described above.

The embodiments of the disclosure provide a computer device, which includes a memory and a processor. The memory is configured to store computer executable instructions, and the processor is configured to run the computer executable instructions on the memory to implement the trajectory prediction method as described above.

The embodiments of the disclosure further provide a computer program which includes a computer-readable code that, when run in an electronic device, causes a processor of the electronic device to implement the trajectory prediction method as described above.

BRIEF DESCRIPTION OF THE DRAWINGS

It is to be understood that the above general descriptions and the following detailed descriptions are only exemplary and explanatory, and do not limit the embodiments of the disclosure. Other characteristics and aspects of the embodiments of the disclosure will become apparent from the following detailed descriptions of the exemplary embodiments with reference to the accompanying drawings.

The drawings herein are incorporated into and constitute a part of the specification, which illustrate embodiments in accordance with the disclosure and together with the specification are used to explain the technical solutions of the disclosure.

FIG. 3B illustrates yet another implementation flowchart of a trajectory prediction method according to embodiments of the disclosure.

DETAILED DESCRIPTION

In order to make the purposes, technical solutions, and advantages of the embodiments of the disclosure clearer, specific technical solutions of the disclosure will further be described below in combination with the drawings in the embodiments of the disclosure in detail. The following embodiments are adopted to describe the disclosure rather than limit the scope of the disclosure.

The embodiments propose a trajectory prediction method which may be applied to a computer device. Functions realized by the method may be implemented by calling a program code through a processor in the computer device, and the program code may be stored in a computer storage medium. It can be seen that the computer device at least includes the processor and the storage medium.

Figure 1:
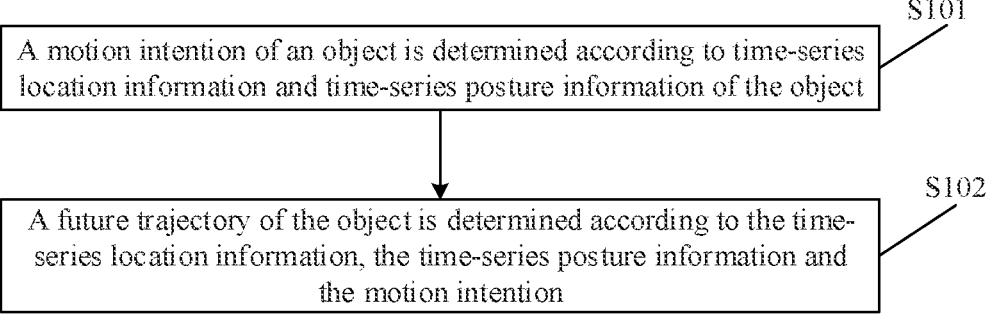
FIG. 1 illustrates an implementation flowchart of a trajectory prediction method according to embodiments of the disclosure.

FIG. 1 illustrates an implementation flowchart of a trajectory prediction method according to embodiments of the disclosure. As shown in FIG. 1, descriptions will be made in combination with the method shown in FIG. 1.

In S101, a motion intention of an object is determined according to time-series location information and time-series posture information of the object.

In some embodiments of the disclosure, the time-series location information is location information of the object at different time positions within a preset time length, and the time-series posture information is posture information of the object at different time points within the preset time length. The object is a movable object in a traffic environment, including a human object, such as a pedestrian or a cyclist. The object may further include a non-human object. The non-human object includes, but is not limited to, at least one of: vehicles with various functions (such as trucks, automobiles, motorcycles, bicycles, etc.), vehicles with various wheel numbers (such as four-wheeled vehicles, two-wheeled vehicles, etc.), and any movable device, such as robots, aircraft, blind guides, smart toys, toy cars, etc. If the object includes the human object, the posture information at different time points includes the orientation information of one or more parts of the human object at the different time points. In this way, the orientation information and location information of one or more different parts of the object at different time points within the preset time length are taken into account to estimate the motion intention of the object, so that the accuracy of the predicted motion intention can be provided.

In S102, a future trajectory of the object is determined according to the time-series location information, the time-series posture information and the motion intention.

In some embodiments of the disclosure, the motion intention is a motion tendency of the object in a future time period, for example, the object is a pedestrian, and the motion intention is whether to pass traffic lights, or whether to go straight, etc., in the future time period. A future trajectory of the object is determined according to the time-series location information, the time-series posture information and the motion intention are combined as a whole and input to a neural network to predict a future trajectory of the object. For example, the time-series location information and the time-series posture information are spliced together in a preset way as fusion feature, and the future trajectory of the object is predicted based on the fusion feature and the motion intention.

In the embodiments of the disclosure, the time-series location information and the time-series posture information of the object (as the input of a learning model) may be used to estimate the intention of a pedestrian (for example, whether to intend to cross a road or the like). As such, the motion intention of the moving object can be determined more accurately by considering the richer time-series location information and the time-series posture information of the moving object. Then, the future trajectory of the object is predicted based on the estimated object intention and the output of the learning model, and moreover, the time-series information on a direction of each of a plurality of parts of the object is used when estimating the intention of the object. In this way, the future trajectory of the moving object are predicted by combining the time-series information of location and posture with the motion intention, so that the accuracy of predicting the future trajectory can be effectively improved.

Figure 2:
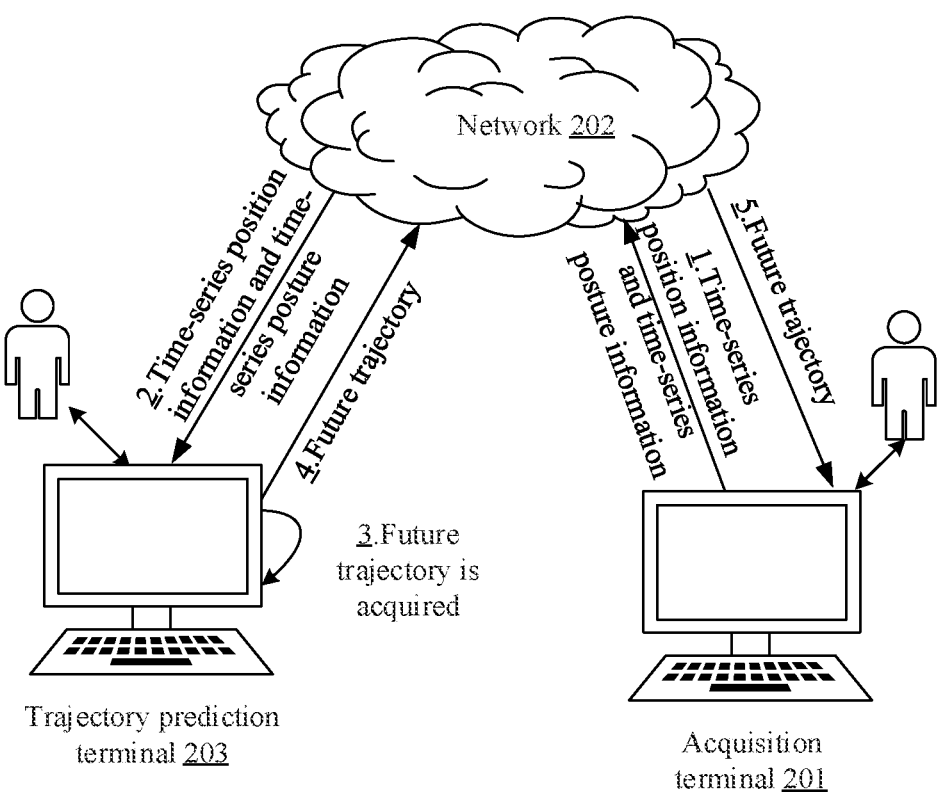
FIG. 2 illustrates a system architecture diagram which may apply a trajectory prediction method according to embodiments of the disclosure.

FIG. 2 illustrates a system architecture diagram which may apply a trajectory prediction method according to embodiments of the disclosure. As shown in FIG. 2, the system architecture includes: an acquisition terminal 201, a network 202 and a trajectory prediction terminal 203. In order to support an exemplary application, when the acquisition terminal 201 and the trajectory prediction terminal 203 establish a communication connection through the network 202, the acquisition terminal 201 reports the time-series location information and the time-series posture information of an object to the trajectory prediction terminal 203 through the network 202. Responsive to the time-series location information and the time-series posture information of the object, the trajectory prediction terminal 203 first determines the motion intention of the object according to the time-series location information and the time-series posture information of the object, and then determines a future trajectory of the object according to the time-series location information, the time-series posture information and the motion intention. Meanwhile, the trajectory prediction terminal 203 uploads the future trajectory of the object to the network 202 and sends it to the acquisition terminal 201 through the network 202.

As an example, the acquisition terminal 201 may include an image acquisition device, and the trajectory prediction terminal 203 may include a visual processing device having visual information processing capability or a remote server. The network 202 may be in a wired or wireless connection mode. When the trajectory prediction terminal 203 is the visual processing device, the acquisition terminal 201 may communicate with the visual processing device in the wired connection mode, for example performs data communication through a bus. When the trajectory prediction terminal 203 is the remote server, the acquisition terminal 201 may perform data interaction with the remote server through a wireless network.

Alternatively, in some scenarios, the acquisition terminal 201 may be a visual processing device having a video acquisition module or a host with a camera. At this time, the trajectory prediction method of the embodiments of the disclosure may be executed by the acquisition terminal 201, and the above system architecture may not include the network 202 and the trajectory prediction terminal 203.

Figure 3A:
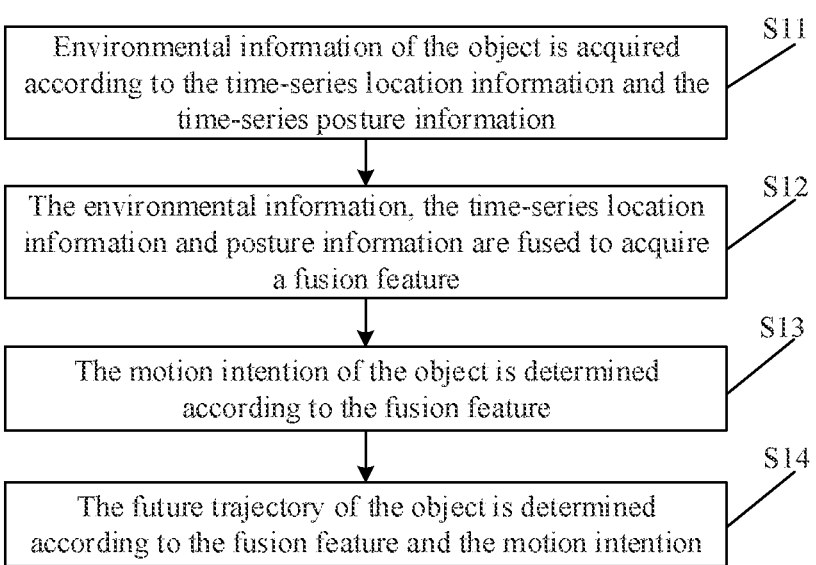
FIG. 3A illustrates another implementation flowchart of a trajectory prediction method according to embodiments of the disclosure.

In some embodiments of the disclosure, map information is integrated into the location information and the posture information to predict the motion intention, which can improve the prediction accuracy. S101 may be realized by the following operation S11-S14 as shown in FIG. 3A. The following descriptions will be made in conjunction with the FIG. 3A.

In S11, environmental information of an environment where an object is located is acquired according to the time-series location information and the time-series posture information.

In some embodiments of the disclosure, the environmental information at least includes one of road information, pedestrian information or traffic light information. A world map is intercepted by referring to the time-series location information and the orientation information in the time-series posture information of the object, so as to acquire local map information of the environment where the object is located. Consequently, the local map information of the object is acquired and determined as the environmental information. The time-series location information and the time-series posture information of the object at historical moments may be acquired through the following processes. First, at least two historical moments, for which a time length from each historical moment to a present moment are less than or equal to a preset time length, are determined. Then, the time-series location information and the time-series posture information of the object at the at least two historical moments are acquired. It is to be understood that the time-series location information and the time-series posture information at a plurality of historical moments, for which the time length from each historical moment to the present moment is less than the preset time length, are acquired. Thus, by acquiring the time-series location information and the time-series posture information at different historical moments as the input information for predicting the future trajectory, the accuracy of the predicted future trajectory can be improved.

In some embodiments of the disclosure, the present moment is 10:05:20, and the time-series location information and the time-series posture information of the object within 5 seconds from the present moment are acquired, that is, the time-series location information and the time-series posture information of the object between 10:05:15 and 10:05:20 are acquired. Herein, the time-series location information and the time-series posture information are related to attributes of the object. For example, if the object is a pedestrian or a cyclist, the time-series location information and the time-series posture information at least include: time-series location information, body orientation and face orientation of the person. If a set of time-series location information and posture information is acquired every 1 second between this historical time period, for example, if the time-series location information and posture information include the body orientation and face orientation of an object, and location of the object, the body orientation, face orientation and location of the object at each moment point are determined. For example, a set of time-series location information and posture information is acquired every one second from 10:05:15 to 10:05:20, that is, there are five moment point distances, then five sets of body orientations, face orientations and locations of the object are determined.

In some embodiments of the disclosure, if the object is a moving device such as a vehicle, the time-series location information and the time-series posture information at least include: time-series location information of the moving device, head orientation of the device and driving instruction information of the moving device. Taking a vehicle as an example, the time-series location information and the time-series posture information may include: time-series location of the vehicle, head orientation and driving instruction information of the vehicle. The driving instruction information may include, but is not limited to, at least one of driving direction, driving speed, lamp status for vehicle (for example, turn lamp status), etc. In this way, the acquired rich time-series location information and posture information are used as the basis for intercepting the world map to acquire the environmental information of the environment where the object is located. That is, the environmental information may be the road structure, sidewalk information and traffic light information of the road in local maps where the object is currently located, which is determined by intercepting the world map based on the location information and orientation information of the object in the time-series location information and the time-series posture information. In this way, the rich time-series location information and posture information of the object are acquired to predict the environmental information such as the road structure where the object is currently located, which improves the accuracy of map division. Even when there are few observation points (even only one frame of observation data), a reasonable prediction result can still be given.

In S12, the environmental information, the time-series location information and the time-series posture information are fused to acquire a fusion feature.

In some embodiments of the disclosure, after the time-series location information and the time-series posture information of the object are obtained, each feature in the time-series location information and posture information is modeled in time series independently. For example, taking a human body as an example, the time-series location information and posture information may include: body orientation, face orientation and a location of the object. The body orientation, the face orientation and the location of the object are separately input into three independent first neural networks to obtain time-series location information and posture information for indicating the changes of the body orientation, the face orientation and the location of the object over time. The time-series location information and the time-series posture information are input into a second neural network to obtain the adjusted time-series location information and adjusted time-series posture information. A plurality of different distances are input into a third neural network (for example, a fully connected model), to obtain weights corresponding to the body orientation, the face orientation and the location of the object under the distances. The weights are multiplied by the adjusted time-series location information and posture information to obtain a multiplication result. The multiplication result is spliced with environmental information acquired by encoding the local maps, and the fusion feature is obtained.

In some embodiments of the disclosure, the time-series location information, the time-series posture information and the environmental information are acquired at the same time point, for example, they are all aimed at five time points in the historical time period, and thus the operation that the multiplication result is multiplied by the environmental information acquired by encoding the local map area may be implemented as follows. A matrix representing the multiplication result is spliced with a matrix representing the environmental information according to rows or columns to form a matrix, namely the fusion feature. Assuming that the matrix representing the multiplication result is a matrix having 3 rows and 5 columns and the matrix representing the environmental information is a matrix having 6 rows and 5 columns, the two matrices are spliced together according to the columns to acquire a matrix having 9 rows and 5 columns, namely the fusion feature is obtained.

In S13, the motion intention of the object is determined according to the fusion feature.

In some embodiments of the disclosure, the motion intention may be understood as the motion tendency of the object during motion. If the object includes a human object, the motion intention may include, but is not limited to, one or more of the following: turning left, turning right, going straight, standing still, turning around, accelerating, decelerating, crossing road, waiting for red light, walking backwards, etc. If the object includes a non-human object, the motion intention may include, but is not limited to, one or more of the following: turning left, turning right, going straight, standing still, changing to left lane, changing to right lane, accelerating, decelerating, overtaking, reversing, waiting for red light, etc.

In some embodiments of the disclosure, the fusion feature is decoded by using a fully connected layer network to obtain probabilities that the fusion feature is each of intention categories in a preset category library, and an intention category with the highest probability is taken as the most probable intention category of the fusion feature. The motion intention of the object is predicted based on the most probable intention category, which can improve the accuracy of predicting the intention.

In the embodiments of the disclosure, S102 may be implemented in the following manner.

In S14, a future trajectory of the object is determined according to the fusion feature and the motion intention.

In some embodiments of the disclosure, the future trajectory of the object in a future period may be predicted based on the fusion feature and the motion intention. Alternatively, the motion intention of the object may also not be predicted, and only the first neural networks are used to iterate the fusion feature several times to predict the future trajectory of the object in the future time period. For example, the predicted future trajectory of the object may be acquired by decoding the second adjusted time-series location information and posture information. In this way, the trajectory prediction is implemented through multiple kinds of time-series location information and posture information, and thus even in the scenes where there are few observation points (even only one frame of observation data), or when the object suddenly accelerates, decelerates, or suddenly turns, the accuracy of predicting the future trajectory can still be guaranteed.

In the embodiments of the disclosure, map information is integrated into the time-series location information and the time-series posture information to predict the motion intention, which can improve the accuracy of predicting the motion intention. Then, the future trajectory of the object is predicted based on the motion intention, which can improve the accuracy of trajectory prediction.

In some embodiments, in order to improve the richness of the input information for predicting the future trajectory, the world map may be intercepted according to the location information and the orientation information of the object to determine the local map area of the present environment of the object. That is, the operation S11 may be implemented by the following processes.

In S111, the world map is intercepted according to the location information and the orientation information of the object at the historical moment, so as to acquire the local map area of the environment where the object is located.

In some embodiments of the disclosure, the orientation information and the location information in the time-series posture information appear in pairs, that is, a location of an object as well as an orientation at the location are determined at a certain historical moment. For example, the object is a human body (for example, a pedestrian or a cyclist). The present road structure where the person is located is determined according to the location information of the person and the body orientation of the person, so as to intercept the world map and determine the local map area where the pedestrian is currently located. If the object is a moving device such as a vehicle, the present road where the vehicle is located is determined according to the location information and the head orientation of the vehicle, so as to intercept the world map to determine the local map area where the vehicle is currently located.

In some embodiments of the disclosure, since there are multiple historical moments, multiple sets of time-series location information and posture information may be acquired after acquiring the time-series location information and the time-series posture information of each historical moment, and then a corresponding local map area may be intercepted for each set of time-series location information and posture information. The interception of the world map may be implemented through the following manner. The local map area of the environment where the object is located is determined according to each location and an orientation of the object at the location in the multiple pieces of time-series location information, and a plurality of local map areas are acquired. The orientation of the object at the location may be understood as orientations of multiple parts of the object at the location. Thus, the local map area of the object is designated by referring to the orientations of the multiple parts of the object at the location, which can improve the accuracy of the determined environmental information, thereby improving the accuracy of predicting the future trajectory.

In some embodiments of the disclosure, the local map area of the environment where the object is located is designated in the world map with the location information as the center and according to the orientation information. For example, taking the location as the center, a rectangular area is designated as the local map area of the environment where the object is located along the direction. As such, multiple local map areas may be determined according to multiple locations and multiple pieces of orientation information at each of the multiple locations. The multiple local map areas are encoded to obtain multiple encoded maps, namely the environmental information. In this way, a local map area is designated by taking a position where an object is located as the center and referring to the orientation at the position of the object, so that the map information included in the designated local map area has a high correlation with the object, that is, the effectiveness of the environmental information can be improved.

In S112, elements in the local map area are encoded to obtain the environmental information.

In some embodiments of the disclosure, each element represents map information of a corresponding area, the map information at least including at least one of road structure information, sidewalks, or road traffic lights. For example, the elements of the local map area are encoded as masks, and each codeword of the masks represents map information of a corresponding area. For example, the environmental information is a matrix including 1 and 0, where 1 represents a sidewalk and 0 represents a dangerous road area, etc. Finally, the multiple pieces of environmental information and the corresponding time-series location information and posture information are fused to acquire multiple groups of fusion features, and the fusion features are classified to predict the motion intention of the object.

In some embodiments of the disclosure, the structure of the first neural network is not limited, including but not limited to Convolutional Neural Network (CNN), Long Short-Term Memory (LSTM), etc. The following is described with the LSTM as an example. The time-series location information and the time-series posture information (for example, taking a pedestrian being the object as an example, a plurality of body orientations, a plurality of face orientations and a plurality of locations where the object is located) at multiple historical moment are input into a bidirectional LSTM network, to respectively obtain time-series location information and posture information for indicating the changes in time of the time-series location information and posture information. The time-series location information and the time-series posture information are input into another bidirectional LSTM network to obtain an output result. A distance is input into a fully connected model to obtain weights corresponding to the body orientation, face orientation and a location of the object under the distance. The weights are multiplied by the adjusted time-series location information and posture information to obtain multiple multiplication results. Then, the multiple multiplication results are spliced with a plurality of encoded maps to form fusion features. Finally, the fusion features are decoded and classified to predict the motion intention of the object, or the fusion features are iterated several times by the LSTM network, and the coordinates obtained after each iteration are predicted to obtain the future trajectory of the object in the future time period. In this way, the world map is intercepted to obtain local maps and the road information in the local maps is encoded, so that the map information can be applied to the subsequent fusion features, and thus the richness of the input information for predicting the future trajectory is improved.

In the embodiments of the disclosure, a local map area of the object is designated according to the location and the orientation of the object, and the local map area is encoded as marks to obtain the environmental information. Herein, each codeword in the masks represents the map information of the area. In this way, the intention of the object is predicted by combining the time-series location information and the time-series posture information of the object with the encoded map, so that a future trajectory of the object is predicted, which can improve the accuracy of the acquired future trajectory.

In some embodiments, time sequence modeling is executed on the extracted time-series location information and posture information of the object, respectively, so as to acquire the time sequence changes of multiple pieces of time-series location information and posture information, and then each piece of time-series location information and posture information are fused with the environmental information to acquire the fusion feature, that is, the operation S12 may be implemented by the following process, as shown in FIG. 3B. FIG. 3B illustrates another implementation flowchart of a trajectory prediction method according to the embodiments of the disclosure. The following descriptions are made in combination with the operations shown in FIG. 3A and FIG. 3B.

In S201, time-series location information and time-series posture information in a future time period is predicted by using a first neural network according to the time-series location information and the time-series posture information.

In some embodiments of the disclosure, the time-series location information and the time-series posture information in the future time period are predicted by taking the time-series location information and the time-series posture information in the historical time period as inputs of the first neural networks. The operation S201 may be implemented through the following processes.

Firstly, the time-series location information and the time-series posture information at each historical moment (i.e., multiple pieces of time-series location information and posture information) are arranged in a time sequence. Then, the multiple pieces of arranged time-series location information and posture information are input into multiple first neural networks respectively to obtain multiple pieces of time-series location information and posture information. The first neural networks may be bidirectional LSTM networks, and the number of the first neural networks matches the types of the time-series location information and the time-series posture information. For example, the object is a pedestrian, and the time-series location information and posture information may include: body orientation, face orientation and location of the object. Then, the first neural network is three independent bidirectional LSTM networks. If the object is a vehicle, the time-series location information and the time-series posture information may include: head orientation of the object, vehicle lamp status and location of the object. Then, the first neural network is three independent bidirectional LSTM networks.

In some embodiments of the disclosure, multiple pieces of time-series location information and time-series posture information are input into the bidirectional LSTM networks to obtain corresponding time-series location information and time-series posture information. For example, the object is a pedestrian, and the body orientations, the face orientations and the locations of the pedestrian at different moments are respectively input into three independent bidirectional LSTM networks to respectively obtain multiple pieces of time-series location information and posture information corresponding to the body orientations at the different moments (indicating the changes of the body orientation over time), multiple pieces of time-series location information and posture information corresponding to the face orientations at the different moments (indicating the changes of the face orientation over time), and multiple pieces of time-series location information and posture information corresponding to the locations of the pedestrian at the different moments (indicating the changes of the location of the object over time).

In some embodiments of the disclosure, if the object is a vehicle, the head orientations of the vehicle, vehicle lamp statuses and the vehicle locations at different moments are respectively input into three independent bidirectional LSTM networks to respectively obtain multiple pieces of time-series location information and posture information corresponding to the head orientations at the different moments (indicating the changes of the head orientation over time), multiple pieces of time-series location information and posture information corresponding to the vehicle light statuses at the different moments (indicating the time changes of the vehicle lamp status over time), and multiple pieces of time-series location information and posture information corresponding to the vehicle locations at the different moments (indicating the changes of the vehicle locations over time).

In some embodiments of the disclosure, the first neural network is a trained neural network, which may be trained in the following mode.

First, the time-series location information and the time-series posture information of the object at multiple historical moments are input into a to-be-trained first neural network to predict the time-series location information and the time-series posture information of the object in a future time period.

In some embodiments of the disclosure, taking the time-series location information and the time-series posture information of the object at the historical moments as the inputs of the first neural network, the corresponding prediction time-series location information and posture information of the object in the future time period may be predicted based on each group of time-series location information and posture information, thereby obtaining the predicted time-series location information and posture information. In some embodiments, the object herein may be understood as a sample object, for example, a pedestrian or an animal in a sample image of a preset dataset. The preset dataset may at least include time-series location information and posture information of the sample object in the sample image. For example, taking the sample object being a pedestrian as an example, the preset dataset at least includes body orientation, face orientation or location of the sample object in the sample image. The time-series location information and posture information of the object at the historical moments may be acquired from such a dataset which is larger in scale and contains richer time-series location information and posture information, so that the richness of the acquired sample data is improved.

Second, the time-series location information and the time-series posture information in the future time period are fused with the environmental information of the environment where the object is located to obtain a fused prediction feature.

In some embodiments of the disclosure, the time-series location information and the time-series posture information predicted by the to-be-trained first neural network are fused with the environmental information to obtain the fused prediction feature.

Next, the future trajectory of the object in the future time period is predicted at least according to the fused prediction feature.

In some embodiments of the disclosure, the fused prediction feature is iterated by using the first neural network so as to predict the future trajectory of the object in the future time period. Or, the fused prediction feature is classified by using a trained fully connected network so as to predict a motion intention of the object, and the motion intention and the fused prediction feature are combined to predict the future trajectory of the object.

Then, a first prediction loss of the to-be-trained first neural network with respect to the future trajectory is determined according to a truth-value trajectory of the object.

In some embodiments of the disclosure, the first prediction loss is determined according to the first neural network, the future trajectory and the truth-value trajectory of the object. For example, the first prediction loss at least includes at least one of average failure prediction rate of the future trajectory having a length greater than a preset threshold, the success rate under different displacement error thresholds of the future trajectory, or the error between an end position of the future trajectory and an end position of the truth-value trajectory. The average failure prediction rate of the future trajectory having a length greater than the preset threshold may be understood as that, for a future trajectory having a length greater than the preset threshold (for example, predicting the future trajectory in the next 5 seconds), the future trajectory is predicted at each moment, a historical trajectory in the first 5 seconds before the moment is taken as an input, for predicting a future trajectory in the next 5 seconds after the moment. Thus, the motion prediction trajectory needs to be predicted many times, so as to get the results of multiple predictions. The number of failed predictions in the results of the multiple predictions is counted, and then the number of failed predictions is divided by the length of the future trajectory to realize normalization. Since there are multiple future trajectories having trajectory lengths greater than the preset threshold, the number of failed predictions for each trajectory is divided by the length of the future trajectory to obtain multiple normalized values. Finally, the multiple normalized values are averaged to obtain the average failure prediction rate for each trajectory.

The success rate under different displacement error thresholds of the predicted future trajectory may be understood as that, different error thresholds are preset for different distances. For example, the larger the distance is, the larger the set error threshold is. If the error of the future trajectory at a certain distance is less than the error threshold, it is determined that the prediction is successful this time. In this way, the performance of the predicted future trajectory under different error thresholds may be depicted, and the detail effect of a neural network is thus improved.

The error between the end position of the future trajectory and the end position of the truth-value trajectory may be understood as a difference between an end point of the future trajectory and an end point of the truth-value trajectory.

Finally, network parameters of the first neural network are adjusted according to the first prediction loss so as to train the first neural network.

In some embodiments of the disclosure, the network parameters may be adjusted directly using the first prediction loss. For example, the network parameters are adjusted by using at least one of the average failure prediction rate of the future trajectory of the predicted future trajectory having a length greater than the preset threshold, the success rate under different displacement error thresholds of the predicted future trajectory, or the error between the end position of the future trajectory and the end position of the truth-value trajectory. In the embodiments of the disclosure, abundant information is used as training samples, so that the first neural network obtained after training has better performance.

The above adjustment process may also be implemented in the following mode. First, the success rate and the average failure prediction rate are compared, and it is determined that the prediction on the future trajectory predicted this time fails when the success rate is less than the average failure prediction rate. Then, the network parameters of the neural network are adjusted by using at least one of the average position error, the average failure prediction rate, the success rate or the error. Therefore, the predicted future trajectory in the training process is evaluated based on multiple evaluation criteria, so that the network parameters of the neural network are adjusted more accurately, and the accuracy of the future trajectory predicted by the adjusted first neural network is higher.

In S202, the time-series location information and the time-series posture information in the future time period are spliced with the environmental information are in a preset mode to acquire the fusion feature.

In some embodiments of the disclosure, the time-series location information and the time-series posture information and the corresponding local maps may be understood as time-series location information and posture information belonging to a set of time-series location information and posture information, and local maps intercepted according to the location information and orientation information in the set of time-series location information and posture information. Multiple pieces of time-series location information and posture information are spliced with the local maps in a one-to-one correspondence according to a preset mode to acquire the fusion feature. The preset mode may be that the time-series location information and the time-series posture information are spliced with the corresponding local maps in an order of inputting the time-series location information and the time-series posture information into the neural network. For example, the object is a pedestrian or a non-motor vehicle rider. Three pieces of time-series location information and posture information are sequentially input into the neural network (for example, an LSTM network) in an order of the pedestrian's body orientation, face orientation and the location of the object. Then, the time-series location information and the time-series posture information are spliced with the corresponding local maps in the order of the pedestrian's body orientation, face orientation and the location of the pedestrian, so as to acquire the fusion feature. Then, the fusion feature is decoded by a fully connected network, for predicting the motion intention of the pedestrian, that is, predicting whether the pedestrian wants to turn left, turn right, go straight, stand still or turn around.

In some embodiments of the disclosure, for example the object is a moving device such as a vehicle, and the time-series location information and posture information may include: time-series location information and posture information of vehicle head, time-series location information and posture information of vehicle position, and time-series location information and posture information of vehicle lamp status. These three pieces of time-series location information and posture information are sequentially input into neural networks (for example, LSTM networks) in the order of the time-series location information and posture information of the vehicle head, the time-series location information and posture information of vehicle position, and the time-series location information and posture information of vehicle lamp status. Then, the time-series location information and posture information are spliced with the corresponding local maps in the order of the time-series location information and posture information of vehicle head, and the time-series location information and posture information of vehicle position, and the time-series location information and posture information of vehicle lamp status, so as to acquire the fusion feature. Next, the fusion feature is decoded by a fully connected network to predict the motion intention of the vehicle, that is, predicting whether the vehicle wants to turn left, turn right, go straight, stand still, change to left vane, change to right vane, overtake or reverse.

The above operations S201 and S202 provide a mode for realizing "fusing the environmental information, the time-series location information and the time-series posture information to obtain the fusion feature". Herein, the time-series location information and posture information are fused with local maps as the environmental information in an order of inputting the time-series location information and posture information into a neural network, which can improve the accuracy of designating areas of the local maps.

In S203, the confidence that the fusion feature is each of the intention categories in an intention category library is determined by using a second neural network.

In some embodiments of the disclosure, the second neural network may be a fully connected network for classifying fusion features. For example, the fully connected network is employed to predict the possibility that the fusion feature is each of the intention categories in the intention category library, and thus the confidence of each intention category may be obtained. In some embodiments of the disclosure, taking the object being a pedestrian as an example, the corresponding intention category library may include: turning left, turning right, going straight, standing still or turning around, etc. A fully connected network is employed to predict the confidence that the fusion feature is each of the following intention categories: turning left, turning right, going straight, standing still or turning around, etc., for example, to predict the probability of each intention category.

In some embodiments of the disclosure, the second neural network is a trained neural network, which may be trained in the following mode.

First, the fusion feature is input into a to-be-trained second neural network, and the confidence that the motion intention of the object is each of the intention categories in an intention category library is predicted.

For example, the to-be-trained second neural network may be a to-be-trained fully connected network, and the fusion feature is input into the to-be-trained second neural network, to predict a probability that the motion intention of the object is each of the categories in the category library. Herein, the object may be a sample object, and the fusion feature of the sample object is input into the to-be-trained second neural network, to classify the motion intentions of the sample object.

Second, a second prediction loss of the second neural network with respect to the confidence of each intention category is determined according to a truth-value intention of the object.

Here, the second prediction loss may be a classified cross entropy loss function.

Finally, network parameters of the to-be-trained second neural network are adjusted according to the second predicted loss to train the to-be-trained second neural network, and then a second neural network is obtained.

For example, the network parameters of the to-be-trained second neural network are adjusted by using the classified cross entropy loss function to train the to-be-trained second neural network, and then a trained second neural network is acquired.

For the whole future trajectory prediction system, the loss function is the sum of the first prediction loss and the second prediction loss. Therefore, the time-series location information and the time-series posture information of the object in the future period are fused, and the fusion feature are used as a sample for training the second neural network, so that the trained second neural network has better classification performance.

In S204, the motion intention of the object is determined according to an intention category with the highest confidence.

In some embodiments of the disclosure, the intention category with the highest probability is selected and determined as the motion intention of the object. For example, a fully connected network is employed to predict the probabilities that the fusion feature may be each of the following intention categories: turning left, turning right, going straight, standing still or turning around to be 0.1, 0.2, 0.2, 0.1 and 0.4, respectively, and then the intention category with the highest probability is turning around, indicating that the most likely motion intention of the object is turning around, and the motion intention of the object is determined as turning around. Therefore, the neural network is employed to perform intention category classification on the fusion feature, so that the most likely motion intention can be accurately predicted.

The above operations S203 and S204 provide an implementation mode of "determining the motion intention of the object according to the fusion feature". Herein, the fusion feature is classified by using a fully connected network, so that the motion intention of the object in the future can be accurately predicted.

In S205, an iteration step size is determined according to a length of a future time period.

For example, the length of the future time period is 3 seconds, and the iteration step size is determined to be 0.3 seconds.

In S206, the motion intention and the fusion feature are iterated according to the iteration step size by using a first neural network, and then the coordinates of the object under each iteration step size are acquired.

In some embodiments of the disclosure, the number of iterations required is first determined according to the iteration step size and the length of the future time period, and then the motion intention and fusion feature are iterated using the first neural network to obtain the coordinates of the object in each iteration. In some embodiments of the disclosure, if the length of the future time period is 3 seconds and the iteration step size is determined to be 0.3 seconds, the number of iterations required is 10 times, then the motion intention and fusion feature are successively iterated using the first neural network, and 10 coordinate values are acquired.

In S207, a future trajectory is determined according to the coordinates of the object under each iteration step size.

For example, based on the above example, 10 coordinate values are acquired after 10 iterations, and the future trajectory of the object may be estimated based on these 10 coordinate values.

In the embodiments of the disclosure, the intention prediction and trajectory prediction of the object are integrated into one system, and the coordinates under each step size are obtained by iteration step by step, so that the future trajectory is predicted, and thus the efficiency and prediction effect of the final predicted future trajectory can be improved.

In other embodiments, after extracting the time-series location information and posture information from multiple pieces of time-series location information and posture information by using the first neural network, the method may further include the following processes.

First, other LSTM networks are employed to adjust each piece of the time-series location information and posture information to acquire first adjusted time-series location information and posture information.

In some embodiments of the disclosure, a bidirectional LSTM network or a fully connected layer model may be employed to adjust the time-series location information and posture information. Each piece of time-series location information and posture information in the time-series location information and posture information is input into the bidirectional LSTM network or the full connected layer model to obtain a weight matrix. Then, the weight matrix is divided into parts with the same types as the time-series location information and posture information, and each part is correspondingly multiplied by each piece of time-series location information and posture information in the time-series location information and posture information to acquire multiple pieces of first adjusted time-series location information and posture information. For example, the object is a pedestrian, and the time-series location information and posture information may include: body orientation, face orientation and location of the object. The three features are input into three independent bidirectional LSTM networks in a one-to-one correspondence, and three pieces of time-series location information and posture information corresponding to the three features are obtained. Then, the three pieces of time-series location information and posture information are successively input into a second neural network in an order of the object's body orientation, face orientation and the object's location to acquire a weight matrix. The weight matrix is divided into three parts, where the first part is multiplied by the time-series location information and posture information at different moments, the second part is multiplied by the time-series location information and posture information at the different moments, and the third part is multiplied by the time-series location information and posture information of the object at the different moments, and thus the first adjusted time-series location information and posture information including the three features are obtained.

Second, a weight vector is acquired by inputting the location information in each piece of time-series location information and posture information into a third neural network, and the weight vector is employed to adjust each piece of first adjusted time-series location information and posture information to obtain second adjusted time-series location information and posture information.

In some embodiments of the disclosure, a fully connected model is employed and weight vectors corresponding to each piece of time-series location information and posture information at multiple locations are output for a plurality of input distances. Moreover, the weight vector corresponding to each piece of time-series location information and posture information is multiplied by the first adjusted time-series location information and posture information corresponding to this piece of time-series location information and posture information to obtain second adjusted time-series location information and posture information. Thus, multiple pieces of second adjusted time-series location information and posture information are obtained.

Finally, the multiple pieces of second adjusted time-series location information, time-series posture information and the environmental information are spliced to obtain the fusion feature.

In some embodiments of the disclosure, the multiple pieces of second adjusted time-series location information and posture information are spliced with a plurality of encoded maps in a preset mode to obtain the fusion feature. For example, taking a pedestrian being the object as an example, three pieces of time-series location information and posture information are sequentially input into a neural network (for example, an LSTM network) in an order of the pedestrian's body orientation, face orientation and the location of the object. Then, the obtained second adjusted time-series location information and posture information may also contain these three features. The second adjusted time-series location information and posture information are spliced with corresponding local maps in an order from the pedestrian's body orientation, face orientation, and the pedestrian's location to the local map, to obtain the fusion feature. Then, the fusion feature is decoded by a fully connected network so as to predict the motion intention of the pedestrian, that is, to predict whether the pedestrian wants to turn left, turn right, go straight, stand still or turn around.

The embodiments of the present disclosure provide a trajectory prediction method. In a driving scene, vehicles, pedestrians or non-motor vehicles may have complex behaviors, such as sudden turning, sudden turning left or right or sudden walking. These complex behaviors cannot be easily predicted or expected only by the historical trajectory of the vehicles, the pedestrians or the non-motor vehicles. However, an autonomous driving system with a perception function may naturally extract richer information and make more information decisions.

In the embodiments of the disclosure, the orientation of an object is used to describe the motion of the object and a local map area so as to describe the surrounding static environment. The positions in the local map are expressed as points (x, y) in the horizontal plane, and the volume direction and face direction are extracted from a corresponding Red-Green-Blue (RGB) image, and then projected onto the horizontal plane, expressed as unit vectors $(d_x, d_y)$. The local map area is acquired from a high-definition map and contains multiple pieces of road information, such as crosswalks, lane lines, junctions or sidewalks.

In the embodiments of the disclosure, a data collection vehicle is used to collect trajectory data of object in urban driving scenes. The vehicle is equipped with cameras, 64-line lidar, radar, a Global Positioning System (GPS) or an Inertial Measurement Unit (IMU). In the embodiments of the disclosure, an annotated high-definition map is utilized to detect, analyze, track and generate the future trajectory of the object through the perception function. The embodiments of the disclosure provide the future trajectory and original data of a pedestrian at 10 HZ. Herein, the original data may include original images, point cloud points, ego-car poses and high-definition maps. In the embodiments of the disclosure, a first neural network and a second neural network (the first neural network and the second neural network may be implemented by using a model of a deep neural network algorithm) are used to obtain an output for the time-series location information and posture information of the object. Table 1 shows the precision of the pedestrian's face and body orientations under different distances between a pedestrian and ego car. The preset dataset provided by the embodiments of the disclosure may include pedestrian's face orientations, body orientations, pedestrian's locations, vehicle lamp information, vehicle head orientation information, etc. In this way, the first neural network and the second neural network are trained by using the dataset containing such abundant information, so that the generalization of the trained first neural network and the second neural network is stronger.

In the embodiments of the disclosure, raw sensor data is collected at a frequency of 10 Hz, including front-view RGB images (800×1762), LiDAR point clouds, ego-car poses and motion information. In order to better describe the road structure, the embodiments of the disclosure provide bird's eye view High Definition Maps (HDMap) with semantic annotations of road classes (i.e., lane lines, junctions, crosswalks, sidewalks, etc.). The road classes are represented as polygons or lines without overlapped areas. The HDMap is cropped and aligned with the ego-car for each data frame. With perception functions on road, informative trajectories of objects are generated by detection and tracking. In some embodiments of the disclosure, the trajectories are further sampled to 0.3 seconds per frame to have more appropriate density. In the embodiments of the disclosure, more than 12,000 minutes of raw data, and samples more than 300,000 different trajectories for vehicles, pedestrians and cyclists are collected.

Figure 4A:
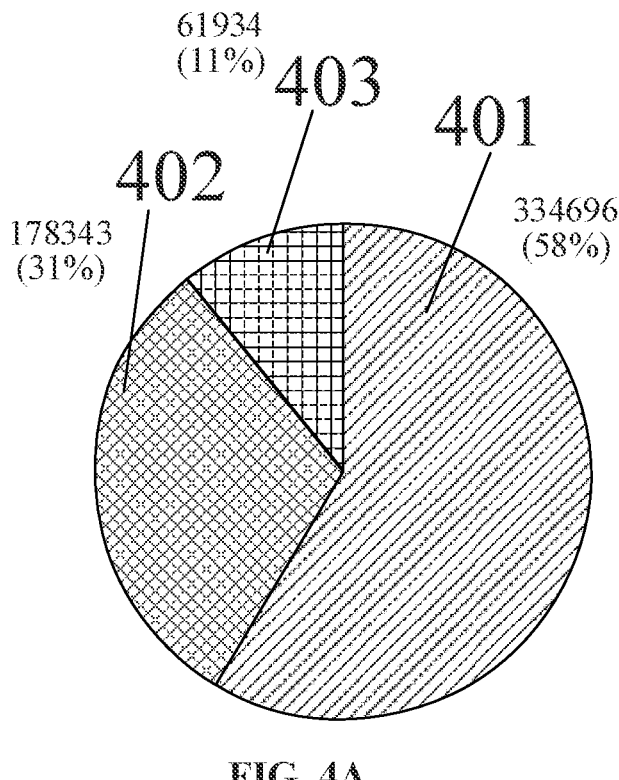
FIG. 4A illustrates a schematic diagram of object distribution in a dataset and intention distribution of each object type according to embodiments of the disclosure.

In order to build a comprehensive description of the traffic scene, semantic attributes and intentions for the objects in the collected trajectories are manually annotated in the embodiments of the disclosure. In the embodiments of the disclosure, different attribute settings are used for each object category to better capture their functions. Specifically, in some embodiments of the disclosure, for Vulnerable Road Users (VRU) such as pedestrians and cyclists, the age (adult/teenager), gender (female/male), face orientation (angle) and body orientation are annotated. For vehicles, the turn lamp status (left turn/right turn/brake) and heading direction are annotated. The intention may be understood as the future action of the object after a specific time (is in the setting of the embodiment of the disclosure) at an observation point. Similar to the attribute, the embodiment of the disclosure defines different intention spaces for vehicles, pedestrians and cyclists, as shown in FIGS. 4A to 4D. FIG. 4A shows different objects, namely vehicles 401, pedestrians 402 and cyclists 403. Herein, the number of the vehicles 401 is 334696, accounting for 58%, the number of the pedestrians 402 is 178343, accounting for 31%, and the number of the cyclists 403 is 61934, accounting for 11%.

Figure 4B:
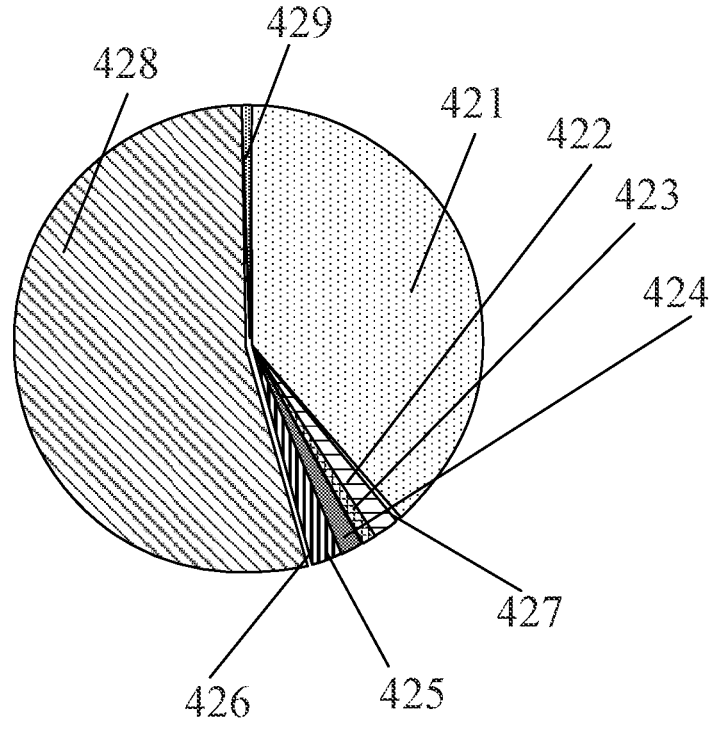
FIG. 4B illustrates another schematic diagram of object distribution in a dataset and intention distribution of each object type according to embodiments of the disclosure.

FIG. 4B shows a result of intention prediction for a vehicle. Herein, going straight 421 accounts for 38.9% (i.e., the vehicle's intention to go straight is 38.9%), left turn 422 accounts for 2%, right turn 423 accounts for 1%, left lane change 424 accounts for 1.6%, right lane change 425 accounts for 2%, left overtaking 426 accounts for 0.1%, right overtaking 427 accounts for 0.1%, standing still 428 accounts for 54%, and other 429 accounts for 0.2%.

Figure 4C:
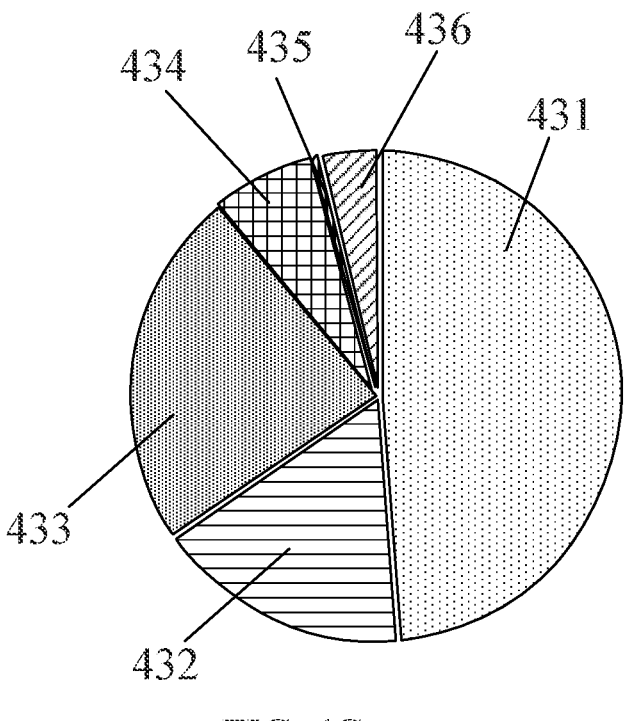
FIG. 4C illustrates yet another schematic diagram of object distribution in a dataset and intention distribution of each object type according to embodiments of the disclosure.

FIG. 4C shows a result of intention prediction for a pedestrian. Herein, going straight 431 accounts for 48.6%, left turn 432 accounts for 16.8%, right turn 433 accounts for 23.6%, standing still 434 accounts for 6.8%, turning around 435 accounts for 0.4%, and other 436 accounts for 3.7%.

Figure 4D:
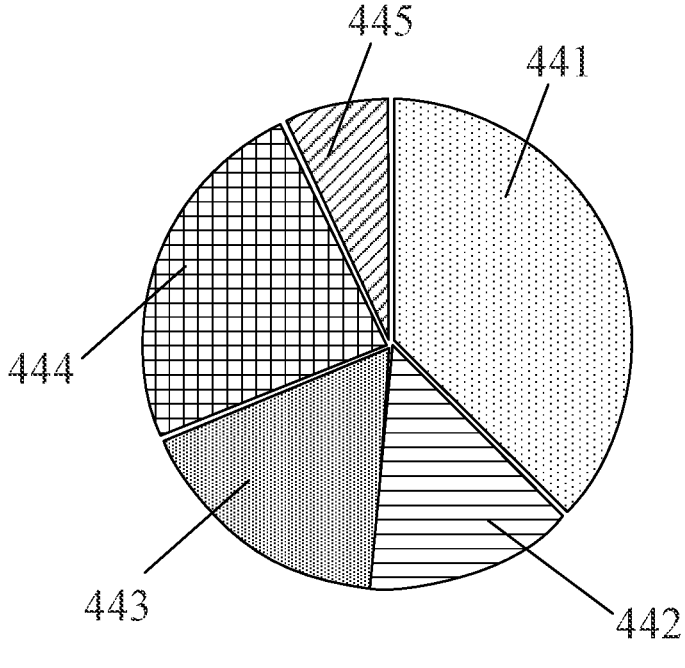
FIG. 4D illustrates still another schematic diagram of object distribution in a dataset and intention distribution of each object type according to embodiments of the disclosure.

FIG. 4D shows a result of intention prediction for a cyclist. Herein, going straight 441 accounts for 37.5%, left turn 442 accounts for 13.5%, right turn 443 accounts for 17.9%, standing still 444 accounts for 24%, turning around accounts for 0.1%, and other 445 accounts for 7%.

Compared with most trajectory prediction datasets, the dataset of the embodiments of the disclosure covers more object categories and provides rich context annotations including road information and attribute annotations. The dataset of the embodiments of the disclosure uses more general intention definition, and significantly surpass at the data scale.

Figure 5:
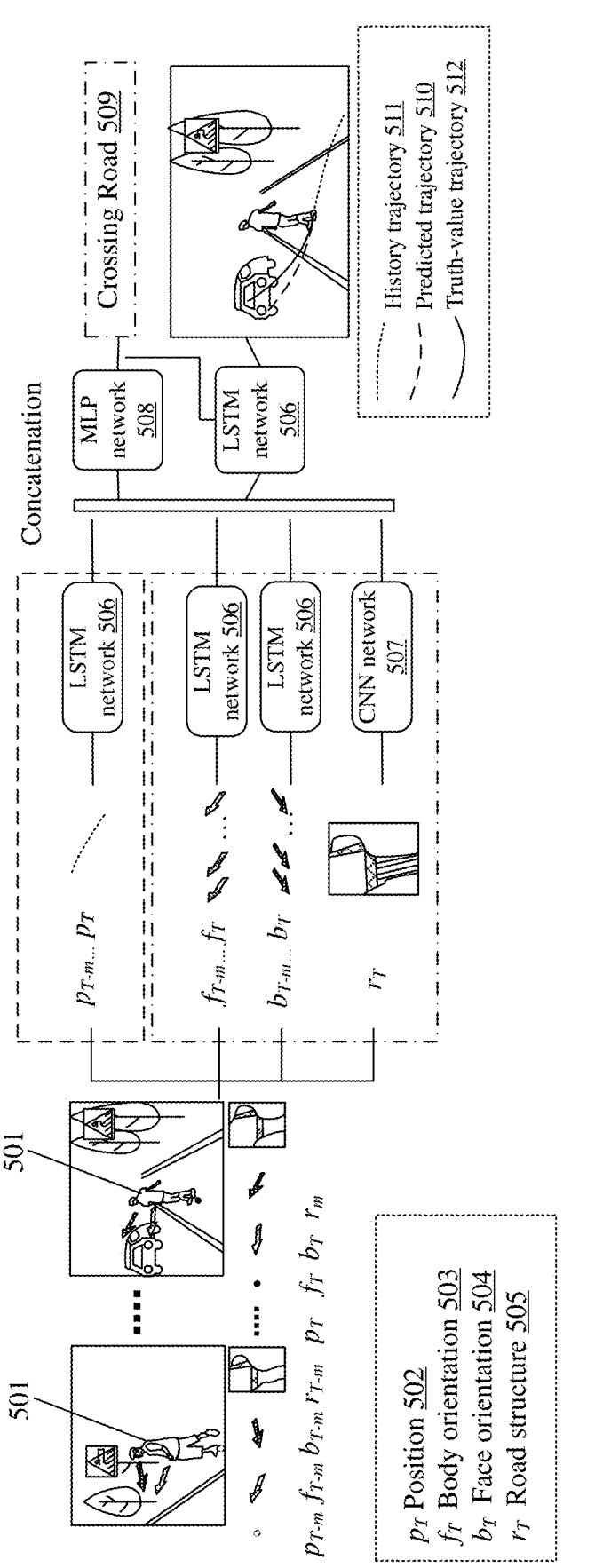
FIG. 5 illustrates a frame diagram of a trajectory prediction system according to embodiments of the disclosure.

In the embodiments of the disclosure, a unified framework is employed to jointly predict future trajectories and potential intentions of objects. At least one of the first neural network and the second neural network employed in the embodiments of the disclosure may include, but is not limited to, LSTM-based encoder-decoder architecture to keep the framework straightforward and general. First, an encoder is employed to extract an object feature from a historical motion trajectory and rich contextual information, the object feature including semantic object attributes and a local road structure. Then, a decoder is employed to estimate intention distribution and regress a future location. As shown in FIG. 5, FIG. 5 illustrates a frame diagram of a trajectory prediction system according to embodiments of the disclosure. Descriptions will be made in combination with FIG. 5.

First, time-series location information and time-series posture information of a pedestrian 501 are acquired in a plurality of images collected within a historical moment, including position information 502, body orientation 503, face orientation 504 and a road structure 505 at a present moment.

Then, a time sequence model is established for each piece of time-series location information and posture information, that is, each piece of time-series location information and posture information is input into a first neural network (here, the first neural network may be implemented by an LSTM network 506), to acquire a corresponding time-series feature.

For example, the position information 502 is input into the LSTM network 506 to acquire a time-series feature of location, the body orientation 503 is input into the LSTM network 506 to acquire a time-series feature of body orientation, and the face orientation 504 is input into the LSTM network 506 to acquire a time sequence feature of face orientation. Finally, the road structure 505 is input into a second neural network (here, the second neural network may be implemented by a CNN network 507) to encode the road structure and acquire time-series location information and posture information of the road.

Finally, the time-series location information and posture information of the road are fused with the time-series feature to obtain a fusion feature. The fusion feature is input into the first neural network (here, the first neural network may be implemented by an MLP network 508) to perform intention prediction, and an intention prediction result is crossing road 509. Next, the intention prediction result of crossing road 509 is combined with the fusion feature and then input into the LSTM network 506, and multiple iterations are performed to predict the motion trajectory of the pedestrian, and then a predicted future trajectory 510 is obtained. In FIG. 5, by comparing a historical trajectory 511, the predicted future trajectory 510 and a truth-value trajectory 512 of the pedestrian 501, it may be seen that the accuracy of the predicted future trajectory 510 obtained through the trajectory prediction method provided by the embodiments of the disclosure is very high.

In FIG. 5, a set of LSTM or CNN networks are used to encode the motion history and multi-modal contextual input of the object according to the specific form of each data item. After the encoded features are spliced into a fusion feature, the fusion feature is fed into a decoder to jointly predict the future trajectory and potential intention.

In the embodiments of the disclosure, for each time step size t (for example, the value of t may be greater than 0 and less than T), the observation result of the i-th object is denoted as $$f_t^i = (p_t^i, c_t^i),$$

where $$p_t^i$$

is location information, and $$c_t^i$$

is contextual information. Given the observations in a discrete time interval $t \in [T-n:T]$, the embodiment of the disclosure can realize the prediction of future locations of the object at $t \in [T-n:T]$ and intention IT, where T is the last observation time (for example, the value of T may be greater than 0 and less than 5 minutes), and n, m are the observation time length and prediction time length respectively (for example, the values of n and m may be real numbers greater than 0 and less than 5 minutes).

In the embodiments of the disclosure, a set of bidirectional LSTM networks are used as the first neural network to encode multi-source input data. The historical trajectory of the object $p_{T-m:T}$ is directly input into an LSTM to obtain the hidden states at time T (denoted as $$e_T^p)$$

as a motion historical feature. The contextual information is processed according to its specific form. For VRUs, the embodiments of the disclosure set $c_t=(f_t,b_t,r_t)$, where $f_t/b_t$ is the face/body direction represented as 2D unit vectors, and $r_t$ is a local road structure map which is centered at the ego-car and rotated to align the y-axis with the heading direction of the ego-car. For vehicles, the embodiments of the disclosure set $c_t=(l_t,h_t,r_t)$, where $l_t$ is the lamp status in 3D binary vectors, $h_t$ is the heading orientation of the ego-car, and $r_t$ is the same as that in the VRU setting. In the embodiment of the disclosure, semantic attributes such as face orientation and vehicle lamp status are closely related to the object's intention and future motion, and reflect the inherent characteristics of the object, which cannot be obtained from the motion history. The local maps provide road structure to regularize the trajectory prediction. In the implementation of the embodiment of the disclosure, similar to the process of motion history encoding, the direction (i.e., face, body and vehicle forward direction) sequence and the lamp status sequence are directly input into independent bidirectional LSTMs, respectively. The embodiment of the disclosure uses the local map once within the observation time T to reduce the redundancy. The embodiment of the disclosure first rasterizes an original map, and then inputs the rasterized map into a CNN model to extract time-series location information and posture information of the map. Finally, all the encoded vectors are concatenated as the fusion feature embedding at time T, as shown in Formula (1):

$$e_T = \phi(p_{T-m:T}, c_{T-m:T}) \tag{1}$$

where $\phi$ denotes a transformation function of the entire encoder.

The embodiment of the disclosure models the intention prediction as a classification problem, where the model predicts a posterior probability distribution over a limited intention set according to the fusion feature $e_T$ of a given object. The embodiment of the disclosure uses a Multilayer Perceptron (MLP) to connect a softmax layer as an intention classifier. During training, the embodiment of the disclosure minimizes the cross entropy loss, as shown in Formula (2):

$$L_{Int} = -\log I_T^{k_T} \tag{2}$$

where $$I_T^{k_T}$$

is the predicted probability of true intention at time T (index denoted as $k_T$).

The embodiment of the disclosure considers trajectory prediction as a sequence generation task, and adopts a LSTM decoder to predict the object motion at each future time step size. The feature embedding $e_T$ is fed into the decoder at the beginning. Particularly, the embodiment of the disclosure determines an intention embedding feature $$e_T^I$$

by passing an output of an intention classifier through another fully connected layer, and uses the intention embedding feature as an auxiliary input of the trajectory decoder to provide a good condition for trajectory prediction. The embodiment of the disclosure minimizes a Gaussian-like loss function during training, as shown in Formula (3):

$$L_{Traj} = -\sum_{t=T+1}^{T+n} \log P(x_t, y_t \mid \sigma_t, \mu_t, \rho_t) \tag{3}$$

where $(x_t, y_t)$ is the ground-truth location at time t, and $\sigma_t$, $\mu_t$, $\rho_t$ are prediction Gaussian distribution parameters representing the trajectory prediction. The neural network in the embodiment of the disclosure may be end-to-end trainable in a multi-task manner by optimizing a global loss function $L=L_{Traj}+\lambda L_{Int}$. In some embodiments, the Gaussian mean may also be used as the predicted trajectory location.

In other embodiments, the following descriptions will be made by taking a pedestrian being the object as an example.

Table 1 shows the accuracy of body orientation and face orientation collected at different collection distances. It can be seen from Table 1 that the location, body orientation and face orientation of the pedestrian are used to represent the dynamic situations of the pedestrian, while a local map area is used to represent the static surrounding environment. In the embodiment of the disclosure, the location, body orientation, and face orientation, i.e., time-series location information and posture information of the pedestrian may be regarded as dynamic features, while the local map area may be regarded as static features.

TABLE 1

| Accuracy of body orientation and face orientation of pedestrian at different distances. | | | | | |
|---|---|---|---|---|---|
| Feature | ≤10 | 10-20 | 20-30 | 30-40 | 40-50 | >50 |
| Body direction | 97.1% | 94.7% | 92.3% | 90.0% | 88.7% | 80.1% |
| Face direction | 92.1% | 90.6% | 87.7% | 84.2% | 81.6% | 72.9% |

As shown in Table 1, the accuracy of the face orientation and the body orientation is related to the distance from the pedestrian to the ego car. The accuracy of the feature becomes lower when the distance is longer. Therefore, the weights of the time-series location information and posture information are adjusted on different time-series location and time-series posture information at different distances. In the embodiment of the disclosure. an embedded function $\phi$ is used to express the relationship, as shown in Formula (4):

$$d_p^{ti}, d_f^{ti}, d_b^{ti} = \phi(d_i^t; W_{dis}) \tag{4}$$

where $$d_i^t$$

denotes the distance between the i-th pedestrian and the ego car at the time step size t, $W_{dis}$ denotes a conversion parameter from input to output in the second neural network, and $$d_p^{ti}, d_f^{ti}, d_b^{ti}$$

denote corresponding weight vectors output for the location, face orientation and body orientation after different distances are input in the second neural network.

A pedestrian follows basic traffic rules, which are related to corresponding local road structures. The local map area is the basic static environment for predicting the future trajectory of the pedestrian.

Figure 6:
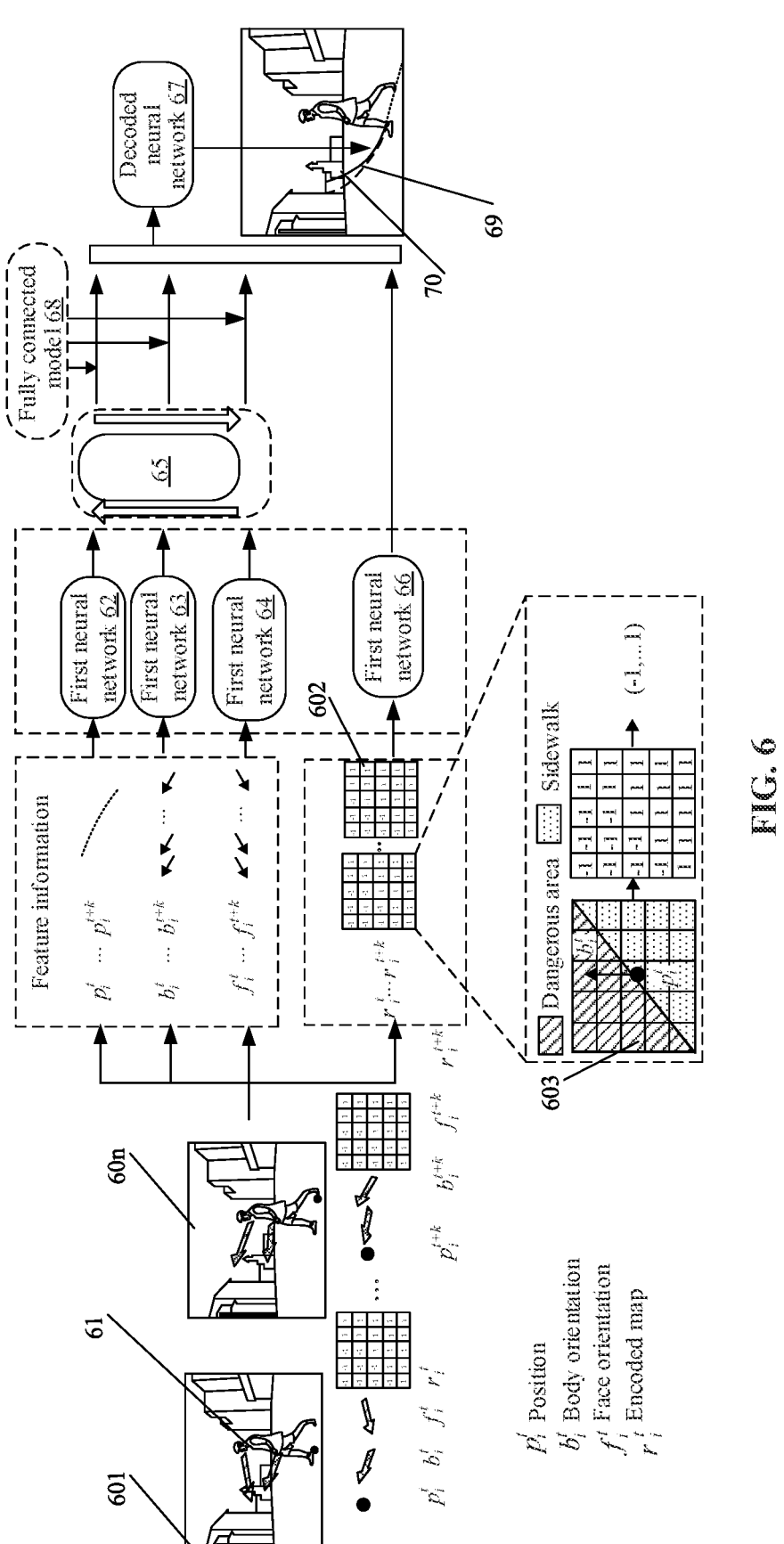
FIG. 6 illustrates an implementation framework diagram of a trajectory prediction method according to embodiments of the disclosure.

The area between each of the lane lines is regarded as a "dangerous space" for the pedestrian. FIG. 6 illustrates an implementation framework diagram of a trajectory prediction method according to embodiments of the disclosure. As shown in FIG. 6, first, time-series location information and time-series posture information of a pedestrian 61, such as face orientation $$f_i^t,$$

body orientation $$b_i^t,$$

and position or location $$p_i^t$$

of the pedestrian 61, as well as a local map area $$r_i^t$$

determined according to the body orientation and the location, are extracted from images 601 to 60n.

Second, the position $$p_i^t,$$

body orientation $$b_i^t$$

and face orientation $$f_i^t$$

of the pedestrian 61 are separately input into three independent first neural networks 62, 63 and 64 (e.g., biorientational LSTM networks), to obtain the changes of a time-series feature indicating the body orientation (i.e., time-series location and posture information), a time-series feature indicating the face orientation and a time-series feature indicating the location of a sample object over time, respectively. Next, the time-series features are input into another second neural network 65 (e.g., a bidirectional LSTM network) to obtain first adjusted time-series features. Different distances are input into a fully connected model 68 to obtain weights corresponding to the body orientation, face orientation and location of a moving object at the distances. The weights are multiplied by the first adjusted time-series features to obtain second adjusted time-series features.

Third, encoded maps 602 are expanded into a one-dimensional feature vector, and the one-dimensional feature vector is encoded and input into another bidirectional LSTM network, i.e., a first neural network 66, to obtain a time-series feature corresponding to the one-dimensional feature vector. Then, the time-series feature is taken as an auxiliary feature of the time-series feature corresponding to the time-series location information and time-series posture information of the pedestrian 61, and these features are spliced to obtain a fusion feature. The fusion feature is decoded through a decoded neural network 67 to obtain a predicted future trajectory of the pedestrian, i.e., the dashed line 69. The solid line 70 is a truth-value future trajectory of the pedestrian 61. It can be seen that the prediction result obtained through the network model adopted by the embodiment of the disclosure is very accurate.

The embodiment of the disclosure adopts mask encoding for the local maps to obtain the encoded maps 602. Herein, each codeword of the masks is filled with a specific integer associated with its semantic road structure category. For the i-th pedestrian at time step size t, a local map area corresponding to the pedestrian is first determined according to the location and body orientation of the pedestrian. Then, the local map area is uniformly discretized into grids. Herein, each grid is represented by the structure-like number of the main semantic road structure category. For example, "crosswalks" and "sidewalks" are represented by a number "1", "dangerous places" are represented by a number "4", and others are represented by a number "0", that is, a grid 603 for dividing dangerous or safe areas is acquired.

In some embodiments of the disclosure, the encoded dynamic feature (i.e., the time-series location information and posture information of the pedestrian) and the encoded static feature (i.e., the local map area) are concatenated for prediction. A simple LSTM network is used to predict the future trajectory of the pedestrian.

The preset dataset of historical data provided by the embodiment of the present disclosure is a large-scale and informational trajectory dataset to promote a pedestrian trajectory prediction task in automatic driving. Meanwhile, the dataset has a plurality of evaluation criteria, such as the failure prediction rate of future trajectories having a length greater than a preset threshold, the success rate of the future trajectory position of the future trajectory, or and the error between an end position of the future trajectory an end position of a truth-value trajectory, so as to evaluate the accuracy and robustness of a prediction model. Therefore, even in very complex scenes, the future trajectory of a pedestrian can still be predicted accurately by using the neural network.

Figure 7:
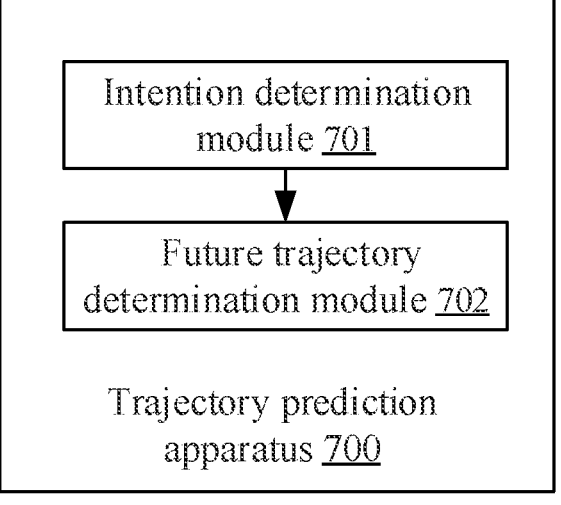
FIG. 7 illustrates a schematic structural diagram of the composition of a trajectory prediction apparatus according to embodiments of the disclosure.

The embodiments of the disclosure provide a trajectory prediction apparatus. FIG. 7 illustrates a structural composition diagram of the trajectory prediction apparatus according to the embodiments of the disclosure. As shown in FIG. 7, the apparatus 700 may include an intention determination module 701 and a future trajectory determination module 702.

The intention determination module 701 is configured to determine a motion intention of an object according to time-series location information and time-series posture information of the object, the time-series location information being the location information of the object at different time points within a preset time period, the time-series posture information being the posture information of the object at different time points within the preset time period, and the posture information at the different time points including the orientation information of the object at the different time points.

The future trajectory determination module 702 is configured to determine a future trajectory of the object according to the time-series location information, the time-series posture information and the motion intention.

In the above apparatus, the intention determination module 701 may include: a map interception sub module, configured to acquire environmental information of environment where the object is located according to the time-series location information and the time-series posture information; a feature fusion sub module, configured to fuse the environmental information, the time-series location information and the time-series posture information to acquire a fusion feature; and an intention prediction sub module, configured to determine the motion intention of the object according to the fusion feature. The future trajectory determination module 702 may include a trajectory prediction sub module, configured to determine the future trajectory of the object according to the fusion feature and the motion intention.

In the above apparatus, the object may include at least one of a human object and a non-human object. In a case that the object includes the human object, the posture information at different time points may include: orientation information of a plurality of parts of the human object at the different time points, and the part may include at least one of limbs or a face. In case that the object includes the non-human object, the posture information at different time points may include orientation information and driving instruction information of the non-human object at different time points, where the non-human object may include at least one of a vehicle, an animal or a mobile device.

The above apparatus may further include a historical moment determination module, configured to determine at least two historical moments for which a time length from each historical moment are less than or equal to a specific time length; and a feature information acquisition module, configured to acquire time-series location information and time-series posture information of the object at the at least two historical moments.

In the above apparatus, the map interception sub module may include a map interception unit, configured to determine the environmental information according to the location information and the orientation information of the object at any historical moment, the environmental information at least including at least one of road information, pedestrian information or traffic light information.

In the above apparatus, the map interception unit may be further configured to designate a local map area of the environment where the object is located in a world map with the location information as the center and according to the orientation information; and encode elements in the local map area to acquire the environmental information.

In the above apparatus, the feature fusion sub module may include a time-series location and posture information determination unit, configured to predict time-series location information and time-series posture information in a future period by using a first neural network according to the time-series location information and time-series posture information; and a feature splicing unit, configured to splice the time-series location information and time-series posture information in the future period, and the environmental information in a preset manner to obtain a fusion feature.

In the above apparatus, the intention prediction sub module may include a confidence determination unit, configured to determine confidences that the fusion feature is each of intention categories in an intention category library by using a second neural network; and an intention prediction unit, configured to determine the motion intention of the object according to an intention category with the greatest confidence.

In the above apparatus, the trajectory prediction sub module may include an iteration step size unit, configured to determine an iteration step size according to a length of the future time period; a feature iteration unit, configured to iterate the motion intention and the fusion feature using the first neural network according to the iteration step size, to obtain the coordinates of the object at each iteration step size; and a future trajectory determination unit, configured to determine the future trajectory according to the coordinates of the object at each iteration step size.

The above apparatus may further include a first training module, configured to train a first neural network.

The first training module may include: a prediction sub module for predicting time-series location information and time-series posture information, and configured to input the time-series location information and time-series posture information of the object into a to-be-trained first neural network, and predict the time-series location information and time-series posture information of the object in the future time period; a prediction feature fusion sub module, configured to fuse the time-series location information and time-series posture information in the future time period with the environmental information of the environment where the object is located, to obtain a fused prediction feature; a prediction future trajectory sub module, configured to predict the future trajectory of the object in the future period at least according to the fused prediction feature; a first prediction loss determination sub module, configured to determine a first prediction loss of the to-be-trained first neural network with respect to the future trajectory according to a truth-value trajectory of the object; and a first neural network parameter adjustment sub module, configured to adjust network parameters of the to-be-trained first neural network according to the first prediction loss to obtain the first neural network.

The above apparatus may further include a second training module, configured to train a second neural network.

The second training module may include a category confidence determination sub module, configured to input the fusion feature into a to-be-trained second neural network, and predict the confidences that the motion intention of the object is each of the intention categories in the intention category library; a second prediction loss determination sub module, configured to determine a second prediction loss of the to-be-trained second neural network with respect to the confidence of each intention category according to a truth-value intention of the object; and a second neural network parameter adjustment sub module, configured to adjust network parameters of the to-be-trained second neural network according to the second prediction loss to obtain the second neural network.

The embodiment of the disclosure further provides a computer program product, which includes computer executable instructions. The computer executable instructions, when being executed, enable to implement the trajectory prediction method provided by the embodiments of the present disclosure.

The embodiment of the disclosure further provides a computer storage medium, having stored thereon computer executable instructions that, when being executed by a processor, implement the trajectory prediction method provided by the above embodiments.

The embodiment of the disclosure further provides a computer program including a computer-readable code. Under the condition that the computer-readable code runs in an electronic device, the processor of the electronic device implements the trajectory prediction method provided by the above embodiments.

Figure 8:
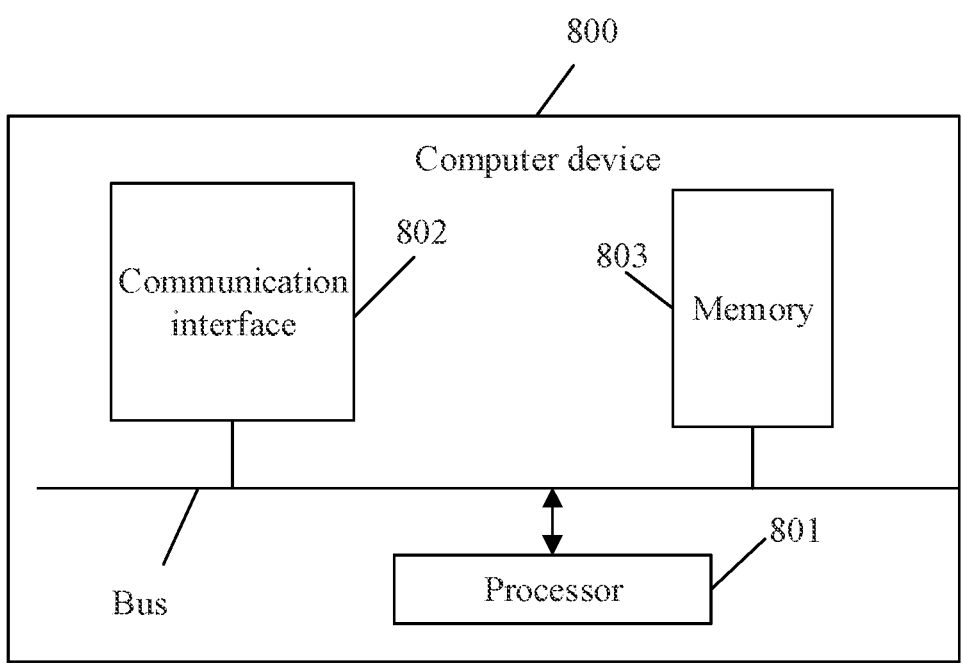
FIG. 8 illustrates a schematic structural diagram of the composition of a computer device according to an embodiment of the disclosure.

The embodiment of the disclosure provides a computer device. FIG. 8 illustrates a composition structure diagram of the computer device of the embodiment of the present disclosure. As shown in FIG. 8, the device 800 may include: a processor 801, at least one communication bus, a communication interface 802, at least one external communication interface, and a memory 803. Herein, the communication interface 802 is configured to implement connection communications between these components. The communication interface 802 may include a display screen, and the external communication interface may include a standard wired and wireless interface. The processor 801 is configured to execute image processing program in the memory to implement the trajectory prediction method provided in the above embodiments.

According to a trajectory prediction method and apparatus, a device, a storage medium and a program provided by the embodiments of the disclosure, time-series location information and time-series posture information of an object are used as inputs to estimate a motion intention of the object, so that the motion intention of the object can be determined more accurately by considering the richer input information of the object; and then, based on the estimated motion intention, the time-series location information and the time-series posture information as input, a future trajectory of the object is predicted, and the orientation information of the object is used in the prediction process. In this way, by combining the time-series location information, the time-series posture information and the motion intention, and taking the orientation information of the object into account, the accuracy of predicting the future trajectory of the object is effectively improved.

In practical applications, the above memory may be a volatile memory, such as a Random Access Memory (RAM); or a non-volatile memory, such as a Read-Only Memory (ROM), a flash memory, Hard Disk Drive (HDD) or Solid-State Drive (SSD); or a combination of the above kinds of memories, and provide instructions and data to the processor.

The above processor may be at least one of an Application Specific Integrated Circuit (ASIC), a Digital Signal Processor (DSP), a Digital Signal Processor Device (DSPD), a Programmable Logic Device (PLD), a Field Programmable Gate Array (FPGA), a Central Processing Unit (CPU), a controller, a microcontroller and a microprocessor. It can be understood that for different devices, other electronic devices may also be configured to realize functions of the processor, and no specific limits are made in the embodiments of the disclosure.

The above descriptions about the embodiments of the trajectory prediction apparatus, the computer device, and the storage medium are similar to the descriptions about the method embodiments, and technical descriptions and beneficial effects are similar to those of the corresponding method embodiments. Due to the space limitation, references can be made to the records in the method embodiments. Technical details undisclosed in the embodiments of the trajectory prediction apparatus, computer device and storage medium of the disclosure may be understood with reference to the descriptions about the method embodiments of the disclosure.

It is to be understood that "one embodiment" or "an embodiment" mentioned throughout the whole specification means that specific features, structures or characteristics related to the embodiments are included in at least one embodiment of the disclosure. Therefore, "in one embodiment" or "in an embodiment" mentioned throughout the specification does not always refer to the same embodiment. In addition, these specific features, structures or characteristics may be combined in one or more embodiments freely as appropriate. It is to be understood that, in each embodiment of the disclosure, a magnitude of a sequence number of each process does not mean an execution sequence and the execution sequence of each process should be determined by its function and an internal logic and should not form any limit to an implementation process of the embodiments of the disclosure. The sequence numbers of the embodiments of the disclosure are adopted not to represent superiority-inferiority of the embodiments but only for description.

It is to be noted that terms "include", "contain" or any other variant thereof are intended to cover non-exclusive inclusions herein, so that a process, method, object or device including a series of elements not only includes those elements but also includes other elements which are not clearly listed or further includes elements intrinsic to the process, the method, the object or the device. Under the condition of no more limitations, an element defined by the statement "including a/an . . . " does not exclude existence of the same other elements in a process, method, object or device including the element.

In some embodiments provided by the disclosure, it is to be understood that the disclosed device and method may be implemented in other manners. The device embodiments described above are only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected according to a practical requirement to achieve the purposes of the solutions of the embodiments.

In addition, various function units in each embodiment of the disclosure may be integrated into a processing unit, or each unit may also serve as an independent unit, or two or more than two units may also be integrated into a unit. The integrated unit may be implemented in a hardware form and may also be implemented in form of hardware and software function unit. Those of ordinary skill in the art should know that all or part of the steps of the method embodiments may be implemented by hardware related to a program instruction. The program may be stored in a computer-readable storage medium, and the program is executed to implement the steps of the method embodiments. The storage medium includes: various media capable of storing program codes such as a mobile storage device, a Read Only Memory (ROM), a magnetic disk, or an optical disc.

Or, when being implemented in form of software function module and sold or used as an independent product, the integrated units of the disclosure may also be stored in a computer-readable storage medium. Based on such an understanding, the technical solutions of the embodiments of the application substantially or parts making contributions to the conventional art may be embodied in form of a computer software product, and the computer software product is stored in a storage medium and includes a plurality of instructions configured to enable a computer device (which may be a personal computer, a server, a network device or the like) to implement all or part of the method in each embodiment of the disclosure. The storage medium includes: various media capable of storing program codes such as a mobile hard disk, a ROM, a magnetic disk, or an optical disc. The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subjected to the scope of protection of the claims.

INDUSTRIAL PRACTICABILITY

The embodiments of the disclosure provide a trajectory prediction method and apparatus, a device, a storage medium and program. A motion intention of an object is determined according to time-series location information and time-series posture information of the object, where the time-series location information is position information of the object at different time points within a preset time period, and the time-series posture information is posture information of the object at different time points within the preset time period, where the posture information at the different time points includes orientation information of multiple parts of the object at the different time points. A future trajectory of the object is determined according to the time-series location information, the time-series posture information and the motion intention.

The invention claimed is:

1. A trajectory prediction method, executed by an electronic device, comprising:

according to time-series location information of an object and orientation information in time-series posture information of the object, dividing a world map to determine a local map area of an environment in which the object is located, thereby determining environmental information of the environment in which the object is located;

determining a motion intention of the object according to the time-series location information, the time-series posture information, and the environmental information, wherein the time-series location information is location information of the object at different time points within a preset time period, wherein the time-series posture information is posture information of the object at the different time points within the preset time period, wherein the posture information at the different time points comprises the orientation information of the object at the different time points; and determining a future trajectory of the object according to the time-series location information, the time-series posture information and the motion intention, wherein determining the motion intention of the object according to the time-series location information, the time-series posture information, and the environmental information comprises:

fusing the environmental information, the time-series location information and the time-series posture information to obtain a fusion feature; and determining the motion intention of the object according to the fusion feature;

wherein determining the future trajectory of the object according to the time-series location information, the time-series posture information and the motion intention comprises:

determining the future trajectory of the object according to the fusion feature and the motion intention, wherein the object comprises at least one of a human object or a non-human object, wherein in a case that the object comprises the human object, the posture information at the different time points comprises orientation information of one or more parts of the human object at the different time points, the one or more parts comprising at least one of limbs or a face; and in a case that the object comprises the non-human object, the posture information at the different time points comprises orientation information and driving instruction information of the non-human object at the different time points, wherein the non-human object comprises at least one of a vehicle or a movable device, wherein fusing the environmental information, the time-series location information and the time-series posture information to obtain the fusion feature comprises:

predicting the time-series location information and the time-series posture information in a future time period by using a first neural network according to the time-series location information and the time-series posture information; and splicing the time-series location information and the time-series posture information in the future time period, and the environmental information in a preset mode to obtain the fusion feature, wherein determining the motion intention of the object according to the fusion feature comprises:

determining confidences that the fusion feature is each of intention categories in an intention category library by using a second neural network; and determining the motion intention of the object according to an intention category with a highest confidence, wherein an accuracy of a face orientation and a body orientation is related to a distance from a pedestrian to the vehicle, and weights of the time-series location information and the posture information are adjusted on different time-series location and time-series posture information at different distances.

2. The method of claim 1, wherein before determining the motion intention of the object according to the time-series location information, the time-series posture information, and the environmental information, the method further comprises:

determining at least two historical moments, wherein a time length from each of the at least two historical moments to a present moment is smaller than or equal to a specific time length; and acquiring the time-series location information and the time-series posture information of the object at the at least two historical moments.

3. The method of claim 1, wherein dividing the world map to determine the local map area of the environment in which the object is located according to the time-series location information of the object and the orientation information in the time-series posture information of the object, thereby determining the environmental information of the environment in which the object is located comprises:

determining the environmental information according to the location information and the orientation information of the object at any historical moment, wherein the environmental information at least comprises at least one of road information, pedestrian information or traffic light information.

4. The method of claim 3, wherein determining the environmental information according to the location information and the orientation information of the object at any historical moment comprises:

determining the local map area of the environment where the object is located by dividing the world map with the location information as a center and according to the orientation information; and encoding elements in the local map area to obtain the environmental information.

5. The method of claim 1, wherein determining the future trajectory of the object according to the fusion feature and the motion intention comprises:

determining an iteration step size according to a length of the future time period;

iterating the motion intention and the fusion feature by using the first neural network according to the iteration step size, to obtain coordinates of the object under each iteration step size; and determining the future trajectory according to the coordinates of the object under each iteration step size.

6. The method of claim 1, wherein a training method of the first neural network comprises:

inputting the time-series location information and the time-series posture information of the object into a to-be-trained first neural network, and predicting time-series location information and time-series posture information of the object in the future time period;

fusing the time-series location information, the time-series posture information in the future time period and the environmental information, to obtain a fused prediction feature;

predicting a future trajectory of the object in the future time period at least according to the fused prediction feature;

determining a first prediction loss of the to-be-trained first neural network with respect to the future trajectory according to a truth-value trajectory of the object; and adjusting network parameters of the to-be-trained first neural network according to the first prediction loss to obtain the first neural network.

7. The method of claim 1, wherein a training method of the second neural network comprises:

inputting the fusion feature into a to-be-trained second neural network, to predict the confidences that the motion intention of the object is each of the intention categories in the intention category library;

determining a second prediction loss of the to-be-trained second neural network with respect to the confidences of each intention category according to a truth-value intention of the object; and adjusting network parameters of the to-be-trained second neural network according to the second prediction loss to obtain the second neural network.

8. The method of claim 1, wherein a relationship between the face orientation and the body orientation is explained by a following formula:

$$d_p^{ti}, d_f^{ti}, d_b^{ti} = \Phi(d_i^t; W_{dis})$$

where $\Phi$ denotes an embedded function,
where $$d_i^t$$

denotes a distance between an i-th pedestrian and the vehicle at a time step size t, where $W_{dis}$ denotes a conversion parameter from input to output in the second neural network, and where $$d_p^{ti}, d_f^{ti}, \text{ and } d_b^{ti}$$

denote corresponding weight vectors output for a location, the face orientation and the body orientation after the different distances are input in the second neural network.

9. An electronic device, comprising:

a processor; and a memory for storing instructions executable by the processor, wherein the processor is configured to:

according to time-series location information of an object and orientation information in time-series posture information of the object, divide a world map to determine a local map area of an environment in which the object is located, thereby determining environmental information of the environment in which the object is located, determine a motion intention of the object according to the time-series location information, the time-series posture information, and the environmental information, wherein the time-series location information is location information of the object at different time points within a preset time period, wherein the time-series posture information is posture information of the object at the different time points within the preset time period, wherein the posture information at the different time points comprises the orientation information of the object at the different time points; and determine a future trajectory of the object according to the time-series location information, the time-series posture information and the motion intention, wherein the processor is specifically configured to:

fuse the environmental information, the time-series location information and the time-series posture information to obtain a fusion feature; and determine the motion intention of the object according to the fusion feature, wherein the processor is further configured to:

determine the future trajectory of the object according to the fusion feature and the motion intention, wherein the object comprises at least one of a human object or a non-human object, wherein in a case that the object comprises the human object, the posture information at the different time points comprises orientation information of one or more parts of the human object at the different time points, the one or more parts comprising at least one of limbs or a face; and in a case that the object comprises the non-human object, the posture information at the different time points comprises orientation information and driving instruction information of the non-human object at the different time points, wherein the non-human object comprises at least one of a vehicle or a movable device, wherein the processor is specifically configured to:

predict the time-series location information and the time-series posture information in a future time period by using a first neural network according to the time-series location information and the time-series posture information; and splice the time-series location information and the time-series posture information in the future time period, and the environmental information in a preset mode to obtain the fusion feature, wherein the processor is specifically configured to:

determine confidences that the fusion feature is each of intention categories in an intention category library by using a second neural network; and determine the motion intention of the object according to an intention category with a highest confidence, wherein an accuracy of a face orientation and a body orientation is related to a distance from a pedestrian to the vehicle, and wherein the processor is specifically configured to:

adjust weights of the time-series location information and the posture information on different time-series location and time-series posture information at different distances.

10. The electronic device of claim 9, wherein the processor is further configured to: before determining the motion intention of the object according to the time-series location information, the time-series posture information, and the environmental information, determine at least two historical moments, wherein a time length from each of the at least two historical moments to a present moment is smaller than or equal to a specific time length; and acquire the time-series location information and the time-series posture information of the object at the at least two historical moments.

11. The electronic device of claim 9, wherein the processor is specifically configured to:

determine the environmental information according to the location information and the orientation information of the object at any historical moment, wherein the environmental information at least comprises at least one of road information, pedestrian information or traffic light information.

12. The electronic device of claim 11, wherein the processor is specifically configured to:

determine the local map area of the environment where the object is located by dividing the world map with the location information as a center and according to the orientation information; and encode elements in the local map area to obtain the environmental information.

13. The electronic device of claim 9, wherein a relationship between the face orientation and the body orientation is explained by a following formula:

$$d_p^{ti}, d_f^{ti}, d_b^{ti} = \Phi(d_i^t; W_{dis})$$

where $\Phi$ denotes an embedded function, where $d_i^t$ denotes a distance between an i-th pedestrian and the vehicle at a time step size t, where $W_{dis}$ denotes a conversion parameter from input to output in the second neural network, and where $$d_p^{ti}, d_f^{ti}, \text{ and } d_b^{ti}$$

denote corresponding weight vectors output for a location, the face orientation and the body orientation after the different distances are input in the second neural network.

\* \* \* \* \*